(12) United States Patent
Era

(10) Patent No.: US 7,488,076 B2
(45) Date of Patent: Feb. 10, 2009

(54) PROJECTION DISPLAY DEVICE AND PROJECTION DISPLAY SYSTEM

(76) Inventor: Kazunari Era, 4-1-11-201, Matsuba-cho, Kashiwa-shi, Chiba 277-0827 (JP)

( * ) Notice: Subject to any disclaimer, the term of this patent is extended or adjusted under 35 U.S.C. 154(b) by 353 days.

(21) Appl. No.: 10/593,575

(22) PCT Filed: Apr. 1, 2005

(86) PCT No.: PCT/JP2005/006478

§ 371 (c)(1),
(2), (4) Date: Sep. 20, 2006

(87) PCT Pub. No.: WO2005/096073

PCT Pub. Date: Oct. 13, 2005

(65) Prior Publication Data
US 2007/0211227 A1 Sep. 13, 2007

(30) Foreign Application Priority Data
Apr. 2, 2004 (JP) .............................. 2004-110254

(51) Int. Cl.
*G03B 21/00* (2006.01)
*G02B 27/22* (2006.01)
*H04N 9/47* (2006.01)
*H04N 13/04* (2006.01)
*H04N 15/00* (2006.01)

(52) U.S. Cl. .............................. 353/7; 359/476; 348/55; 353/98

(58) Field of Classification Search .................... 353/7, 353/99, 98, 69; 385/132, 129; 348/42, 46, 348/51, 55, 60, 771; 345/1.1, 1.2, 3.3, 3.4; 359/476, 466, 212, 214, 215, 221, 223–226, 359/290–292
See application file for complete search history.

(56) References Cited

U.S. PATENT DOCUMENTS

| 6,657,765 | B2 * | 12/2003 | Hayashi et al. | 359/225 |
| 7,057,826 | B2 * | 6/2006 | Cho et al. | 359/683 |
| 2005/0057812 | A1 * | 3/2005 | Raber | 359/619 |

FOREIGN PATENT DOCUMENTS

JP    A-57-109481    7/1982

(Continued)

*Primary Examiner*—William C Dowling
*Assistant Examiner*—Ryan Howard
(74) *Attorney, Agent, or Firm*—Oliff & Berridge, PLC

(57) ABSTRACT

A projection display device D includes an acquiring means 2 that acquires a pixel value Cg and a depth value Cz for each of a plurality of pixels constituting an image, a light output means 3 that outputs pixel display light Ld per pixel according to the pixel value, a light guide body 5 that guides the pixel display light Ld to a position corresponding to the pixel on a projection surface 8, and changes the light path length of the pixel display light Ld to the projection surface 8 according to the depth value Cz of the pixel. The light guide body 5 includes a reflector 51 that has mirror surfaces 511a opposing each other. The light path length control means 3 changes the number of times the pixel display light is reflected by the mirror surfaces 511a of the reflector 51 according to the depth value Cz of the pixel.

15 Claims, 14 Drawing Sheets

FOREIGN PATENT DOCUMENTS

| | | |
|---|---|---|
| JP | A-03-096913 | 4/1991 |
| JP | A-04-195030 | 7/1992 |
| JP | A-04-289845 | 10/1992 |
| JP | A-06-253341 | 9/1994 |
| JP | A-10-333093 | 12/1998 |
| JP | A-2000-019454 | 1/2000 |
| JP | A-2000-295108 | 10/2000 |
| JP | A-2002-123842 | 4/2002 |
| JP | A-2002-196413 | 7/2002 |
| JP | A-2003-295108 | 10/2003 |

* cited by examiner

| DEPTH VALUE | PIXEL POSITION | DRIVE CONTENT | AMPLITUDE |
|---|---|---|---|
| Cz1 | (1,1) | ~ | Am1 |
|  | (1,2) | ~ | Am2 |
|  | ⋮ | ⋮ | ⋮ |
| Cz2 | (1,1) | ~ | Am1' |
|  | (1,2) | ~ | Am2' |
|  | ⋮ | ⋮ | ⋮ |
| ⋮ | ⋮ | ⋮ | ⋮ |

TBL

[PORTION C]   [PORTION B]   [PORTION A]

PROJECTION DISPLAY DEVICE AND PROJECTION DISPLAY SYSTEM

TECHNICAL FIELD

The present invention relates to a technique for viewing an image stereoscopically.

BACKGROUND ART

Various methods have heretofore been proposed for allowing a viewer to view an image stereoscopically. For example, Patent Document 1 discloses a method for displaying a synthesized image composed of right-eye and left-eye images with parallax on a display device, and allowing the viewer's right-eye to see only the right-eye image and the viewer's left-eye to see only the left-eye image. According to this method, the viewer is able to perceive a sense of depth that depends on the amount of parallax between the right-eye and left-eye images (hereinafter, "horizontal parallax").

Patent Document 1: JP 2002-123842A (paragraphs 0002 and 0005)

DISCLOSURE OF THE INVENTION

Problem to be Solved by the Invention

However, with this type of technique it is necessary to restrict the horizontal parallax to within a specific range. If the horizontal parallax is too great, the viewer of the image may suffer eyestrain or have a queasy feeling like seasickness, or the viewer may be unable to perceive a sense of three-dimensionality as a result of the left-eye and right-eye images being perceived separately. More specifically, the horizontal parallax at which the viewer can perceive a sense of three-dimensionality on the screen of a display device is at the very most around 8 mm (around 6.5 cm if a projector is used to project an enlarged image onto a screen). Consequently, the viewer cannot be made to perceive a sense of depth corresponding to a horizontal parallax that exceeds this limit. For example, if an image whose sense of three-dimensionality can be perceived is to be displayed by a display device that has three to four pixels arranged in areas 1 mm in length, the number of gradations of the sense of three-dimensionality (number of depth gradations that the user perceives) will be restricted to between 24 and 32 gradations, since the smallest unit of horizontal parallax is one pixel of a display device. Thus, a problem with methods for allowing a viewer to see an image with horizontal parallax is that the viewer cannot be made to perceive an adequate sense of depth. An object of the present invention, which was arrived at in view of the above situation, is to provide a mechanism that is able to allow a viewer to perceive an image rich with a sense of depth.

Means for Solving the Problem

To solve the above problem, a projection display device according to the present invention includes an acquiring means for acquiring a pixel value and a depth value for each of a plurality of pixels constituting an image, a light output means for outputting light per pixel according to the pixel value, a light guide body for guiding the light output per pixel from the light output means to a position corresponding to the pixel on a projection surface, and a control means for changing a light path length of the light output per pixel from the light output means to the projection surface according to the depth value of the pixel. Based on a configuration in which the depth values are determined so that the depth perceived by the viewer (user) increases the larger the depth value, for example, the light length control means controls the light path length from the light output means to the projection surface so that the light path length increases the larger the depth value. According to this configuration, a viewer of an image projected onto the projection surface is able to perceive a sense of depth that depends on the depth values, since the light path length of light output from the light output means to the projection surface is adjusted per pixel according to the depth values. Moreover, in this configuration, horizontal parallax of an image as in conventional technology is unnecessary in principle. Consequently, the viewer can be made to perceive an image having a sufficient sense of depth without being restricted to horizontal parallax.

Also, a projection display device according to the present invention includes an acquiring means for acquiring a pixel value and a depth value for each of a plurality of pixels constituting an image, a light output means for outputting light per pixel according to the pixel value, a reflector having light reflecting surfaces that oppose each other, and for guiding the light output per pixel from the light output means to a position corresponding to the pixel on a projection surface by reflecting the light with the light reflecting surfaces, and a control means for changing the number of times the light output per pixel from the light output means is reflected by the light reflecting surfaces of the reflector according to the depth value of the pixel. Based on a configuration in which the depth values are determined so that the depth perceived by the viewer increases the larger the depth value, for example, the control means controls the reflected number of times in the reflector so that the reflected number of times increases the larger the depth value. According to this configuration, the sense of depth perceived by the viewer increases the greater the reflected number of times of light output from the light output means to the projection surface. Moreover, in this configuration, horizontal parallax of the image as in conventional technology is unnecessary in principle, since the viewer perceives a depth that depends on the reflected number of times in the reflector. Consequently, the viewer can be made to perceive an image having a sufficient sense of depth without being restricted to horizontal parallax.

A configuration for controlling the reflected number of times in the reflector can be adopted in which the position and angle at which light output from the light output means is incident on the reflector is changed. A configuration is conceivable in which the orientation (particularly the angle) of the light output means is changed according to the depth values. However, it is highly probably that a large and complicated configuration will be required to change this angle because the light output means is often composed of various elements such as a light source and a device for modulating the light output from the light source according to the pixel values. Accordingly, in a preferred mode of the present invention, a reflecting member is provided for guiding the light output from the light output means to the reflector by reflecting the light, and the control means drives the reflecting member so that the angle at which the light reflected by the reflecting member is incident on the light reflecting surfaces of the reflector depends on the depth value. In this mode, the angle at which light output from the light output means and reflected by the reflecting member is incident on the reflector is changed by the control means, with the light reaching the projection surface after being reflected by the reflector for a number of times that depends on this angle of incidence. According to this configuration, a reflecting member with light reflectivity need only be driven, making it possible to simplify and miniaturize the configuration in comparison to when the orientation of the light control means is controlled. A configuration in which the orientation of the light control means is controlled, or a configuration that combines this configuration and the configuration for driving the reflecting member can, however, also be adopted in the present invention.

A mode for reflecting the light output from the light output means with a reflecting member can be adopted in which a member supported so that an angle relative to the direction of the light output from the light output means is changeable is used as a reflecting member, and the control means controls the angle of the reflecting member according to the depth value. A known micro mirror device is adopted as this reflecting member, for example. Further, in another mode, the reflecting member is supported so as to be rotatable on a rotary shaft and has a reflecting surface whose angle relative to the direction of the light output from the light output means changes in a circumferential direction of the rotary shaft, and the control means rotates the reflecting member to an angle that depends on the depth value.

Incidentally, in the present invention, light corresponding to the pixels is irradiated onto areas partitioning the projection surface (hereinafter, "unit areas"). In this configuration, because the cross-sectional area of the light flux (hereinafter, "light flux cross-sectional area") output from the light output means decreases the greater the reflected number of times in the reflector, the light flux cross-sectional area of light reaching the projection surface may be smaller than the unit area (see FIG. 7(b)). An area of the unit area not irradiated with light occurs around the area irradiated with light flux in this case, which is likely to invite a drop in display quality. Accordingly, in a preferred mode of the present invention, the control means drives the reflecting member so that an angle at which light reflected by the reflecting member is incident on the light reflecting surfaces of the reflector depends on the depth value, and makes the reflecting member oscillate in the driven state. Because light flux irradiated onto a unit area can be made to move minutely within the unit area according to this configuration by making the reflecting member oscillate (using light flux to paint out the entire unit area, if you like), it appears to the viewer as though the light is being irradiated onto the entire unit area, even when reflected a large number of times in the reflector. Consequently, even if the light is reflected a plethora of times, a drop in display quality caused by this is suppressed.

Alternatively, a configuration can also be adopted in which the light flux cross-sectional area of light output from the light output means is adjusted in advance to be larger the greater the reflected number of times (i.e., the larger the depth value), since the cross-sectional area of light flux on the projection surface becomes smaller the greater the reflected number of times. That is, in this mode, a light flux adjustment means is provided for changing the light flux cross-sectional area of light output from the light output means according to the depth value. Based on a configuration in which the control means changes the reflected number of times in the reflector so that the reflected number of times increases the larger the depth value, for example, the light flux adjustment means changes the light flux cross-sectional area of light output from the light output means so that the light flux cross-sectional area increases the larger the depth value. Even if the light flux cross-sectional area is reduced following the reflection in the reflector, a drop in display quality caused by this is suppressed according to this configuration because the light flux that reaches the projection surface can be made to extend over the entire unit area according to this mode.

Also, the light path length from the projection display device to the projection surface differs depending on the position of the pixel. Consequently, even if the reflected number of times in the reflector is changed according to the depth value, the light path length from the light output means to the projection surface may possibly depart from the light path length that depends on the depth value due to this difference in light path lengths. Accordingly, in a preferred mode of the present invention, a correction means is provided for correcting the depth value of each pixel according to the position corresponding to the pixel on the projection surface, and the control means controls the number of times that light output from the light output means is reflected by the light reflecting surfaces of the reflector according to the depth value after correction by the correction means. For example, the correction means corrects the depth value so that when the same depth value is given to one pixel and another pixel, the light path length of light output from the light output means to the projection surface is substantially the same for the one pixel and the other pixel. According to this mode, display of an image is realized in which depth values are accurately reflected because the depth values are corrected according to the projected position on the projection surface.

The present invention is also specified as a projection display system that uses the projection display device described above. That is, this system includes a screen that has a projection surface and a projection display device for projecting an image onto the screen. The projection display device includes an acquiring means for acquiring a pixel value and a depth value for each of a plurality of pixels constituting an image, a light output means for outputting light per pixel according to the pixel value, a light guide body for guiding the light output per pixel from the light output means to a position corresponding to the pixel on the projection surface, and a control means for changing a light path length of the light output per pixel from the light output means to the projection surface according to the depth value of the pixel. According to this configuration, similar effects are obtained to the projection display device of the present invention.

Note that the projection surface of the screen preferably is composed of a first reflecting surface for reflecting the light output from the projection display device, and a second reflecting surface for reflecting the light reflected by the first reflecting surface on a viewing side, the first and second reflecting surfaces respectively being arranged in sheets. According to this configuration, the light output from the projection display device can be reliably output on the viewing side. In particular, the reflection of the viewer on the projection surface (i.e., the viewer is aware of his or her own figure on the projection surface) is avoided if the first reflecting surface is substantially horizontal, and the second reflecting surface forms a prescribed angle with the first reflecting surface (e.g., 45 degrees). Further, if the second reflecting surface is divided into a plurality of unit portions, each of which is a curved surface whose center protrudes more than a periphery thereof, light reflected by the second reflecting surface can be output over a wide area, this being particularly suitable in the case where a large number of viewers view images on a large-scale screen. If the second reflecting surface is substantially planar, the manufacturing process can be simplified and manufacturing costs reduced in comparison to when the unit portions of this reflecting surface are curved. Also, display unevenness of an image that depends on the position on the projection surface is suppressed if the first reflecting surface is divided into a plurality of unit portions whose angle relative to a horizontal surface is selected for each unit portion according to an angle at which light output from the projection display device reaches the unit portion.

Effects of the Invention

According to the present invention, the viewer can be made to perceive an image that is rich with a sense of depth.

BRIEF DESCRIPTION OF THE DRAWINGS

FIG. 7(*b*) shows the image of pixel display light extending over only part of a unit area.

FIG. 9(*b*) is a cross-sectional view seen from an IXb-IXb line in FIG. 8.

FIG. 9(*c*) is a cross-sectional view seen from an IXc-IXc line in FIG. 8.

FIG. 10(*b*) is a side view showing the positional relation between a projection display device and a projection surface.

FIG. 13(*b*) is an enlarged view of various portions of the screen.

FIG. 14(*b*) is a front view and end views showing a further configuration of the second mirror surface according to the sixth embodiment.

FIG. 14(*c*) is a front view and end views showing a further configuration of the second mirror surface according to the sixth embodiment.

FIG. 18(*b*) is a perspective view showing the configuration of a reflector according to modification 1.

FIG. 18(*c*) is a perspective view showing the configuration of a reflector according to modification 1.

DESCRIPTION OF REFERENCE NUMERALS

Figure 1:
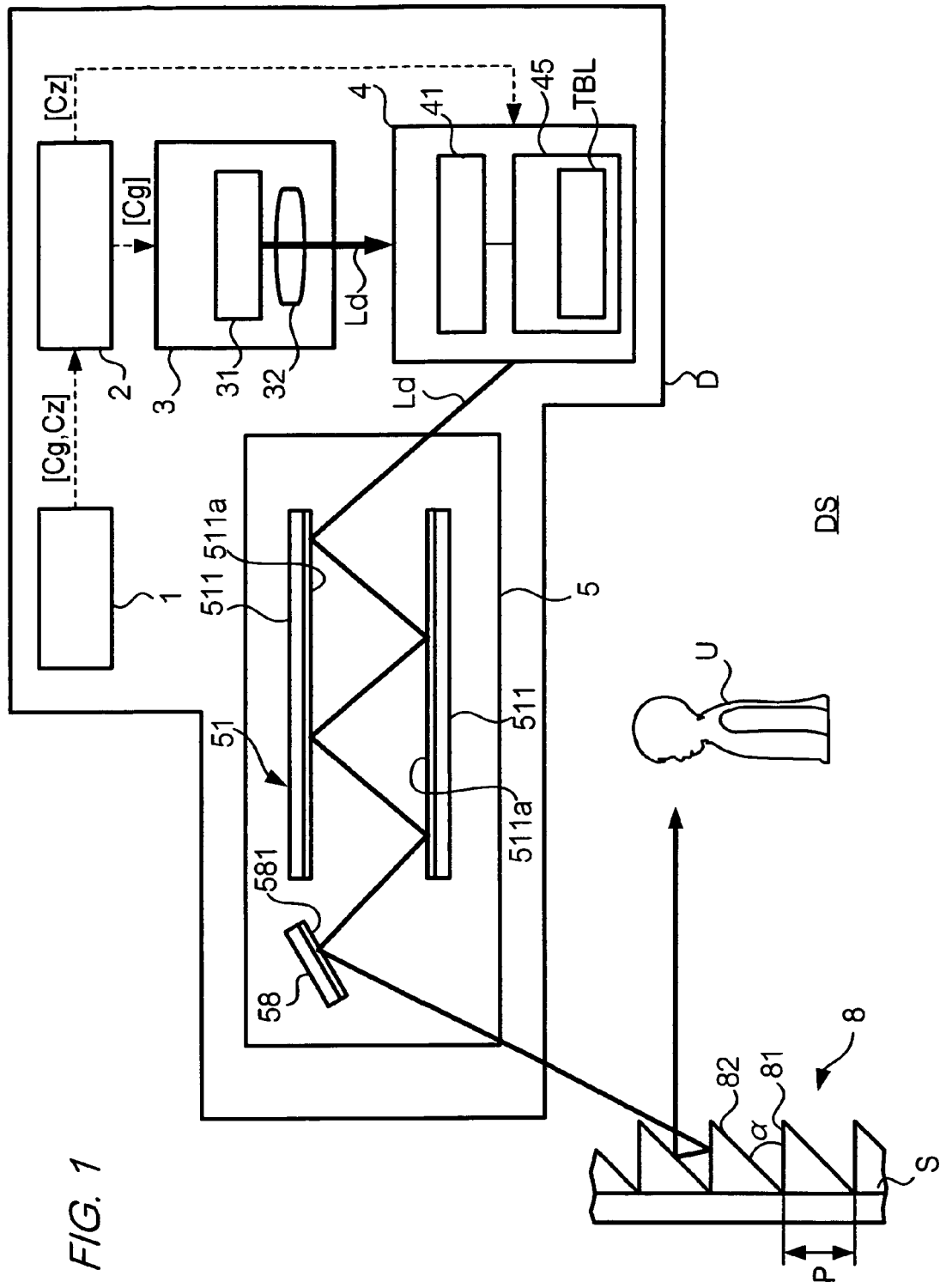
FIG. 1 is a block diagram showing the configuration of a projection display system according to an embodiment of the present invention.

DS: projection display system, D: projection display device, 1: storage means, 2: acquiring means, 3: light output means, 31: light source, 32: lens, 35: light flux adjusting means, 351: plate member, 351*a*: slit, 352: rotary shaft, 355: control means, 4: light path length control means, 41, 42: adjustment reflecting member, 411, 421: mirror surface, 412: fulcrum, 413: metal plate, 422: rotary shaft, 45: control means, 47: correction means, 451: instruction means, 452: magnetic field generator, 5: light guide body, 51, 52, 53, 54: reflector, 511: reflecting member, 511*a*: mirror surface, 58: output reflecting member, 581: mirror surface, S: screen, 6 (6-1, 6-2, 6-3, 6-4, 6-5, 6-6, 6-7, 6-8, 6-9): imaging device, 70: casing, 8: projection surface, 81: first mirror surface, 82: second mirror surface, TBL: table, Ld: pixel display light, Au: unit area, Pu: unit portion Pu, Ls: horizontal surface, Im: image, Cg: pixel value, Cz: depth value

BEST MODE FOR CARRYING OUT THE INVENTION

Embodiments of the present invention are described here with reference to the drawings. Note that for convenience of description, the dimensions and proportions of the constituent elements in the drawings shown below have been altered accordingly from those of the actual elements.

A. First Embodiment

FIG. 1 is a block diagram showing the configuration of a projection display system DS according to a first embodiment of the present invention. As shown in this figure, the projection display system DS includes a projection display device D and a screen S having a projection surface 8. Note that in FIG. 1 the solid arrow shows the path taken by light, while the broken arrows show the path taken by electronic signals (data).

The projection display device D is for projecting a color image (hereinafter, "display image") composed of a plurality of colors onto the projection surface 8 of the screen S, and includes a storage means 1, an acquiring means 2, a light output means 3, a light path length control means 4, and a light guide body 5. The storage means 1 stores a pixel value Cg and a depth value Cz for each pixel constituting the display image. Various types of devices can be adopted as the storage means 1, including, for example, a hard disk device that incorporates a magnetic disk, a device for driving a portable recording medium typified by a CD-ROM, or a semiconductor memory such as a RAM.

Figure 2:
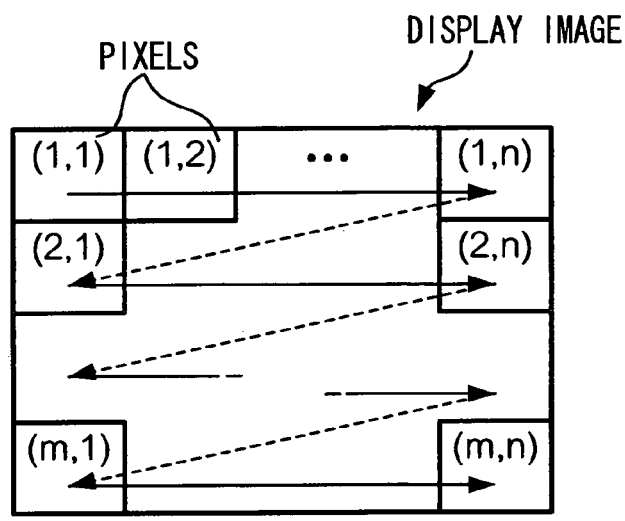
FIG. 2 shows the configuration of an image to be displayed by the projection display system.

The pixel values Cg are numeric values showing the content for display by each pixel. The gradation values of the colors red, green and blue, for example, are specified as pixel values Cg. The depth values Cz (Z values) are numeric values showing for each pixel a depth that a viewer U should perceive, and are determined so that the depth perceived by the viewer U increases (i.e., the viewer U perceives things as being positioned further back) the larger the depth value Cz. In other words, the numeric values determined as the depth values Cz decrease the smaller the depth perceived by the viewer U. The gradation values of the pixels when representing the image using gray scales, or numeric values calculated by performing various corrections on these gradation values are used as the depth values Cz. In the present embodiment, a case is assumed in which the display image is constituted by pixels arrayed in m number of horizontal rows and n number of vertical columns, as shown in FIG. 2 (m and n are both positive integers). For this reason, the pixel values Cg and the depth values Cz are stored in the storage means 1 for each of "m×n" total number of pixels. The acquiring means 2 reads the pixel values Cg and the depth values Cz of the pixels sequentially per pixel from the storage means 1, and outputs the pixel values Cg to the light output means 3 and the depth values Cz to the light path length control means 4.

Figure 3:
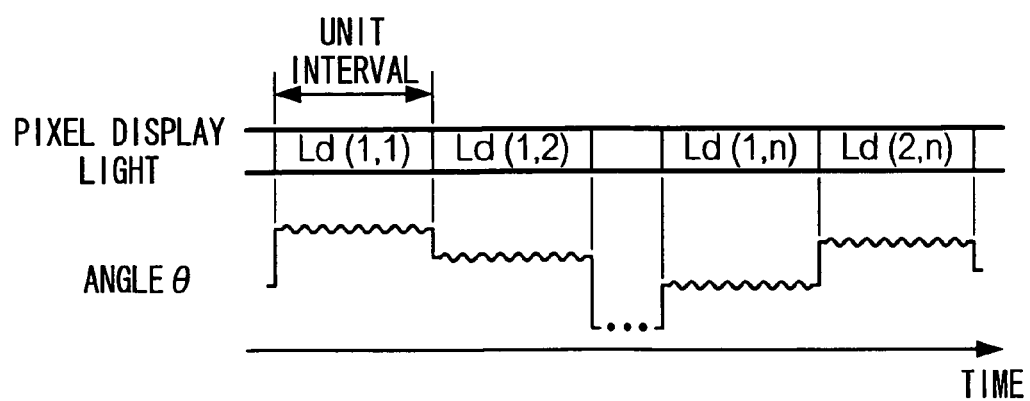
FIG. 3 is a timing chart for illustrating the operation of the projection display system.

The light output means 3 outputs light per pixel according to the pixel values Cg input from the acquiring means 2. As shown in FIG. 1, the light output means 3 includes a light source 31 and a lens 32. The light source 31 outputs light (hereinafter, "pixel display light") Ld per pixel whose wavelength components corresponding to the colors red, green and blue have light intensities that are specified by the pixel values Cg. More specifically, the light source 31 has light emitting diodes corresponding to the colors red, green and blue, and controls the light emission intensity of the light emitting diodes corresponding to these colors according to the gradation values specified by the pixel values Cg for each color. The lens 32 is a convex lens (condenser lens) for converting the pixel display light Ld output from the light source 31 to substantially parallel light. Based on this configuration, the light output means 3 outputs pixel display light Ld corresponding to each of the plurality of pixels in order at predetermined time intervals (hereinafter, "unit intervals"). In the present embodiment, pixels targeted for output of pixel display light Ld are switched at unit intervals from left to right per row, and targeted rows are switched from top to bottom, as shown by the arrows in FIG. 2. That is, pixel display light Ld corresponding to the pixel in the first row of the first column is output from the start to the end of the first unit interval, and pixel display light Ld corresponding to the pixel in the first row of the second column is output from the start to the end of the second unit interval, as shown in FIG. 3. Once pixel display light Ld for each of the n number of pixels belonging to the first row has been output, pixel display light Ld for each of the pixels in the second row from the first column to the nth column is then output sequentially, after which this outputting operation is repeated for the entire image (one frame). If the display image is a moving image composed of a plurality of still images arranged on a time axis, this series of operations is repeated for the entire display image.

As shown in FIG. 1, the pixel display light Ld output from the light output means 3 is incident on the light guide body 5 via the light path length control means 4. This light guide body 5 is for guiding the pixel display light Ld output per pixel from the light output means 3 to a position corresponding to the pixel on the projection surface 8 of the screen S. Unit areas Au corresponding to each of the pixels constituting the display image are demarcated on the projection surface 8 of the screen S. That is, unit areas Au are demarcated over the m horizontal rows and n vertical columns on the projection surface 8 so as to correspond to the array of pixels in the display image. The pixel display light Ld corresponding to the pixel in the ith row (i being a positive integer satisfying $1 \leq i \leq m$) of the jth column (I being positive integer satisfying $1 \leq j \leq n$) is guided by the light guide body 5 to the unit area Au at the ith row of the jth column on the projection surface 8.

As shown in FIG. 1, the light guide body 5 has a reflector 51 and an output reflecting member 58. The reflector 51 is configured with a pair of opposing reflecting members 511 that are disposed at a distance from each other so that their respective plate surfaces are substantially parallel. Mirror surfaces 511a are formed on the opposing plate surfaces of the reflecting members 511. The mirror surfaces 511a mirror-reflect (total reflection) light reaching the surface thereof. Based on this configuration, incident pixel display light Ld from the light path length control means 4 is output from the reflector 51 after being repeatedly reflected alternately by the mirror surfaces 511a. The output reflecting member 58 is for reflecting the pixel display light Ld output from the reflector 51 onto the projection surface 8 of the screen S, and has a mirror surface 581 that mirror-reflects the pixel display light Ld reaching the surface thereof. As described above, the pixel display light Ld reflected by the output reflecting member 58 is irradiated onto the corresponding unit area Au of the projection surface 8.

The light path length control means 4 is for changing the light path length of the pixel display light Ld output from the light output means 3 to the projection surface 8 according to the depth value Cz of the pixel. If, as in the present embodiment, the numeric values determined as the depth values Cz increase the greater the depth that should be perceived by the viewer U, the light path length control means 4 changes the light path length of the pixel display light Ld so that the light path length increases the larger the depth value Cz input from the acquiring means 2. Elaborating further, the light path length control means 4 changes the number of times (hereinafter, "reflected number of times") the pixel display light Ld output per pixel from the light output means 3 is reflected by the mirror surfaces 511a of the reflector 51 according to the depth value Cz of the pixel. Here, because the positional relation of the mirror surfaces 511a is fixed, the reflected number of times differs according to the angle or position at which the pixel display light Ld is incident on the reflector 51. The light path length control means 4 of the present embodiment changes the angle at which the pixel display light Ld is incident on the reflector 51 according to the depth value Cz. More specifically, the light path length control means 4 changes the angle of incidence of the pixel display light Ld on the reflector 51, so that the reflected number of times increases the larger the depth value Cz input from the acquiring means 2 (so that the reflected number of times decreases the smaller the depth value Cz).

Figure 4:
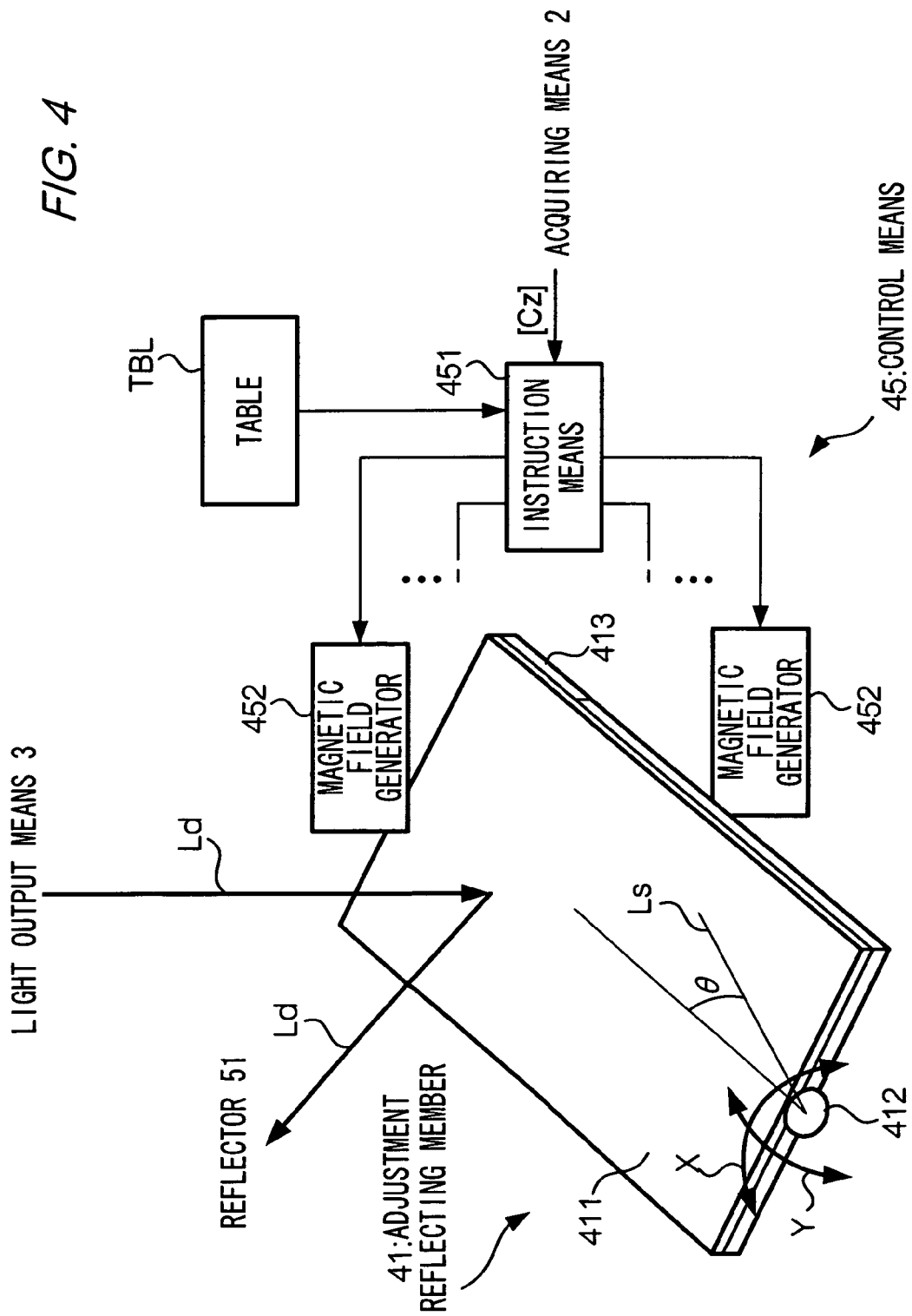
FIG. 4 is a block diagram showing a specific configuration of a light path length control means.

FIG. 4 is a block diagram showing a specific configuration of the light path length control means 4. As shown in FIGS. 1 and 4, the light path length control means 4 has an adjustment reflecting member 41 and a control means 45. The adjustment reflecting member 41 is a substantially rectangular plate member for guiding the pixel display light Ld output from the light output means 3 to the reflector 51 by reflecting the pixel display light Ld, and has a mirror surface 411 that mirror-reflects the pixel display light Ld that reaches the surface thereof. This adjustment reflecting member 41 is supported by the casing (not shown) of the projection display device D via a fulcrum 412, and can be turned in the X direction and the Y direction (directions at right angles to each other) on the fulcrum 412. Further, a metal plate 413 composed of a magnetic body is set up on the opposite side of the adjustment reflecting member 41 to the fulcrum 412.

The control means 45 is for controlling the orientation of the adjustment reflecting member 41 according to the depth value Cz input from the acquiring means 2, and has an instruction means 451 and a plurality of magnetic field generators 452, as shown in FIG. 4. The magnetic field generators 452 generate a magnetic field under the control of the instruction means 451, and include coils for generating a magnetic field whose strength depends on an applied voltage. The instruction means 451 causes the magnetic field generators 452 to generate a magnetic field whose strength depends on the depth value Cz input from the acquiring means 2 by supplying the magnetic field generators 452 with a voltage that depends on the depth value Cz. A magnetic force works on the metal plate 413 of the adjustment reflecting member 41 as a result of the magnetic field generated in this way, and as a result the adjustment reflecting member 41 is driven so that the angle of the adjustment reflecting member 41 relative to a horizontal surface Ls is an angle $\theta$ that depends on the depth value Cz.

Figures 5, 6:
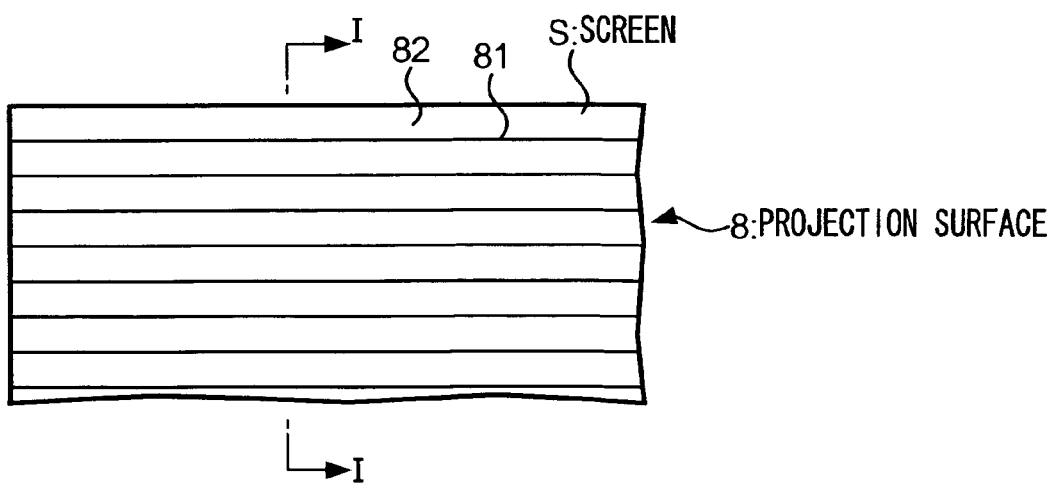
FIG. 5 shows the content of a table referred to in the light path length control means.
FIG. 6 is a front view showing the configuration of a screen.

To execute the drive, the instruction means 451 refers to a table TBL held in a storage means (not shown). In the table TBL, as shown in FIG. 5, the positions of pixels are associated with the contents of the drive on the adjustment reflecting member 41 (hereinafter, referred to as "drive content") and amplitudes Am (Am1, Am2, . . . ) for when the adjustment reflecting member 41 is oscillated, for every depth value Cz (Cz1, Cz2, . . . ) that can be input from the acquiring means 2. Since the adjustment reflecting member 41 is driven using a magnetic field generated by the magnetic field generators 452 in the present embodiment, the voltages that should be supplied to the magnetic field generators 452 are specified as the drive contents of the table TBL. The content of the table TBL is predetermined so that the pixel display light Ld per pixel reaches the unit area Au corresponding to the pixel on the projection surface 8, and the number of times the pixel display light Ld is reflected in the reflector 51 depends on the depth value Cz. The instruction means 451 firstly retrieves the depth value Cz input from the acquiring means 2 from the table TBL, and reads the drive content corresponding to the pixel targeted by the retrieved depth value Cz from the drive content associated with this depth value Cz. Here, the instruction means 451 increments the count of a counter (not shown) whenever the depth value Cz of each pixel constituting a single display image is input, and identifies the position of the pixel based on this count. Alternatively, a configuration is possible in which the acquiring means 2 notifies the position of the pixel together with the depth value Cz to the instruction means 451. The instruction means 451 then drives the adjustment reflecting member 41 by supplying the voltage specified in the read drive content to the magnetic field generators 452. As a result, the angle $\theta$ of the adjustment reflecting member 41 changes at unit intervals according to the depth values Cz in synch with the output of pixel display light Ld. Note that minute changes in the angle $\theta$ of the adjustment reflecting member 41 at unit intervals as well as the amplitudes Am associated with the depth values Cz in the table TBL are described in a later section.

The configuration of the screen S is described next. FIG. 6 is a plan view showing the configuration of the screen S seen from the front of the projection surface 8. A cross-section seen from the line I-I in FIG. 6 equates to the cross-section of the screen S illustrated in FIG. 1. As shown in FIGS. 1 and 6, the screen S includes the projection surface 8 for reflecting pixel display light Ld output from the projection display device D on the viewing side (i.e., the side on which the viewer U is situated). This projection surface 8 is a plane composed of a first mirror surface 81 and a second mirror surface 82 disposed alternately in the vertical direction. As shown in FIG. 1, pixel display light Ld output from the projection display device D is output on the viewing side as a result of being reflected firstly by the first mirror surface 81 and then by the second mirror surface 82. The first mirror surface 81 is a plane that extends in a horizontal direction substantially parallel with a horizontal surface, while the second mirror surface 82 is a plane that extends horizontally at a prescribed angle $\alpha$ with the first mirror surface 81. Consequently, the projection surface 8 can also be seen as a plane composed of a large number of narrow grooves that equate to the intersection of the first mirror surface 81 and the second mirror surface 82 forming an angle $\alpha$ with the first mirror surface 81. In the present embodiment, the angle $\alpha$ formed by the first mirror surface 81 and the second mirror surface 82 is assumed to be approximately 45 degrees. According to this configuration, the viewer U will not be aware of a reflected image of him or herself on the projection surface 8. Note that the dimensions of the first mirror surface 81 and the second mirror surface 82 are selected without regard for the arrangement of the pixels constituting the display image (or the arrangement of the unit areas Au). For example, a pitch P of the first mirror surface 81 and the second mirror surface 82 shown in FIG. 1 does not necessarily match the pitch of the unit areas Au (i.e., distance between the edge of one unit area Au and the corresponding edge of an adjacent unit area Au).

In the configuration described above, as shown in FIG. 1, the pixel display light Ld output per pixel from the light output means 3 is incident on the reflector 51 at an angle that depends on the depth value Cz as a result of passing through the light path length control means 4, and is mirror-reflected repeatedly by the mirror surfaces 511*a* of the reflector 51 a number of times depending on the depth value Cz. This pixel display light Ld reaches the projection surface 8 after being reflected by the output reflecting member 58, before then being mirror-reflected sequentially by the first mirror surface 81 and the second mirror surface 82 to reach the viewer U. Consequently, the viewer U sees an image of the pixel display light Ld projected onto the projection surface 8 (or more precisely, the second mirror surface 82 of the projection surface 8). Further, because the irradiated position (unit area Au) of pixel display light Ld for each pixel on the projection surface 8 is switched sequentially per pixel at cycles that the viewer U is unable to perceive, the viewer U sees an image of the display image on the projection surface 8.

Thus, in the present embodiment, the viewer can be made to perceive an image having a sense of depth that depends on the depth value Cz, since an image of the pixel display light Ld that has been reflected a number of times depending on the depth value Cz (i.e., the light path length has been adjusted according to the depth value Cz) is projected onto the projection surface 8. In this configuration, a stereoscopic image with horizontal parallax as in conventional stereoscopic technology is unnecessary in principle. Consequently, the viewer can be made to perceive an image with a sufficient sense of depth (e.g., an image with a sense of depth equivalent to real scenery), without being restricted to horizontal parallax. Also, in order to generate a plurality of images with horizontal parallax, it is necessary to generate a stereoscopic image by synthesizing images of an object taken a plurality of times from different angles, or by performing various stereoscopic processes on a flat image as disclosed in Patent Document 1. However, according to the present embodiment, these operations can be rendered unnecessary. Further, in the case where a synthesized stereoscopic image composed of right-eye and left-eye images is used, the resolution of the image actually perceived by the viewer is approximately half the resolution of the original stereoscopic image, because of it being necessary to include a single image perceived stereoscopically by the viewer in both the right-eye image and the left-eye image. In contrast, a high definition image with high resolution can be displayed according to the present embodiment, since horizontal parallax does not need to be imparted on the display image.

In conventional stereoscopic technology (e.g., technology allowing the naked eye to perceive a sense of depth by using a mechanism such as a lenticular lens or a parallax barrier), the viewing position that enables a natural sense of depth to be perceived is limited. For this reason, the sense of depth that the viewer perceives at other positions may be unnatural, or the number of persons able to perceive a natural sense of depth may be severely limited. Further, even if the viewer U can be made to perceive a satisfactory sense of three-dimensionality in relation to part of an image (i.e., the middle), the sense of three-dimensionality perceived by the viewer U at the edges of the screen may be unnatural. In contrast, with the present embodiment, it is possible to allow a natural sense of depth to be perceived regardless of the position of viewer U, since the viewer U sees the image of pixel display light Ld that has been reflected a number of times depending on the depth value Cz. This is particularly favorable for displaying images in an environment (e.g., a theater) in which a large number of viewers U view images at the same time, because a natural sense of depth is obtained regardless of the viewing position relative to the projection surface 8 even when images are displayed on a large-scale projection surface 8.

Figure 7A:
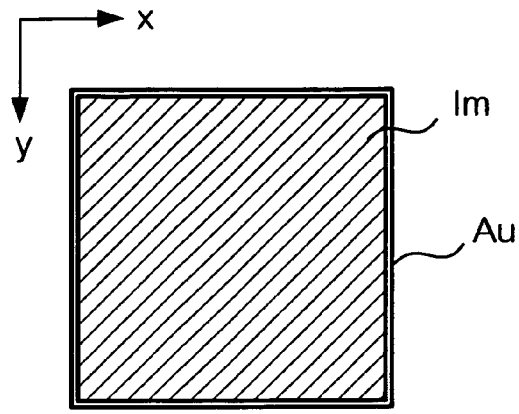
FIG. 7(*a*) shows the image of pixel display light extending over an entire unit area.
Figure 7B:
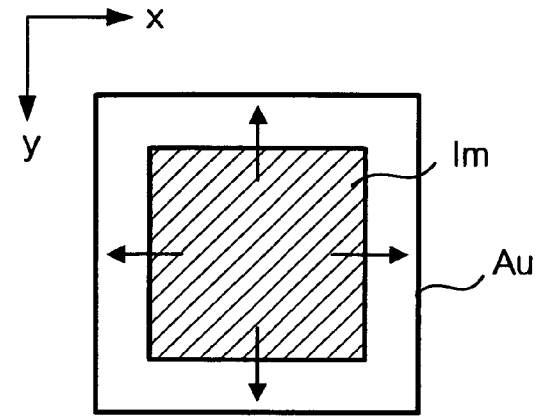

Incidentally, the area of the image of pixel display light Ld projected onto the unit areas Au of the projection surface 8 and seen by the viewer (i.e., the light flux cross-sectional area of the pixel display light Ld) decreases the longer the light path length traveled by the pixel display light Ld to the projection surface 8; that is, the greater the reflected number of times in the reflector 51. For example, even if an image Im of pixel display light Ld extends over the entire unit area Au as shown in FIG. 7(a), when reflected a small number of times in the reflector 51, the image Im of pixel display light Ld will not extend over the entire unit area Au (i.e., the pixel display light Ld is only irradiated onto part of the unit area Au), as shown in FIG. 7(b), if the light flux cross-sectional area of the pixel display light Ld is substantively reduced as a result of the pixel display light Ld being mirror-reflected a large number of times in the reflector 51. In this case, portions not irradiated with light occur around the boundaries of adjacent unit areas Au, possibly causing a drop in display quality of the image perceived by the viewer U. This problem is solved in the present embodiment by changing the traveling direction of the pixel display light Ld minutely within each unit interval.

That is, the control means 45 of the light path length control means 4 makes the adjustment reflecting member 41 oscillate in the X and Y directions in each unit interval at an amplitude Am that depends on the depth value Cz, after having driven the adjustment reflecting member 41 to an angle θ that depends on the depth value Cz as described above. That is, as shown in FIG. 3, the control means 45 makes the adjustment reflecting member 41 oscillate at a higher amplitude Am the larger the depth value Cz input from the acquiring means 2 (i.e., the greater the reflected number of times in the reflector 51 as shown in FIG. 7(b)). Here, amplitudes Am are associated with depth values Cz in the table TBL, as described above. The instruction means 451 constituting the control means 45 identifies a depth value Cz and an amplitude Am that depends on the pixel position by referring to the table TBL, and controls the voltage to the magnetic field generators 452 so that the adjustment reflecting member 41 oscillates at this amplitude Am. Now, assume a configuration in which the image Im of the pixel display light Ld on the projection surface 8 moves in the x direction in FIG. 7(b) when the adjustment reflecting member 41 is rotated in the X direction, and moves in the y direction in FIG. 7(b) when the adjustment reflecting member 41 is rotated in the Y direction. If the adjustment reflecting member 41 is minutely oscillated in the X and Y directions based on this configuration, the image Im of the pixel display light Ld will move over the entire unit area Au, as shown by the arrows in FIG. 7(b). This image Im of pixel display light Ld is assumed to move at a higher speed than the viewer U can perceive. For this reason, the image Im, when seen instantaneously, is perceived by the viewer U as extending over the entire unit area Au, despite only part of the unit area Au being irradiated as shown in FIG. 7(b). Consequently, excellent display quality is realized according to the present embodiment, irrespective of the light path length of the pixel display light Ld (i.e., the reflected number of times in the reflector 51). Note that the values of the amplitudes Am in the table TBL are determined for each depth value Cz so that the image Im of pixel display light Ld that reaches the projection surface 8 moves over the entire unit area Au, as is clear from the above description. For example, an amplitude Am of "zero" is associated with depth values Cz at which the image Im of pixel display light Ld extends over the entire unit area Au as shown in FIG. 7(a), even without making the adjustment reflecting member 41 oscillate, while an amplitude Am that depends on the depth value Cz is associated with depth values Cz at which the image Im of pixel display light Ld only extends over part of the unit area Au as shown in FIG. 7(b), to the extent that the image Im does not cross over the peripheral border of the unit area Au following the movement.

In this way, a drop in display quality caused by a reduction in the light flux cross-sectional area of the pixel display light Ld can be suppressed according to the present embodiment, since the image Im of pixel display light Ld can be made to extend over the entire unit area AU, irrespective of the reflected number of times in the reflector 51.

B. Second Embodiment

The configuration of a projection display system DS according to a second embodiment of the present invention is described next. The configuration of this projection display system DS is common with the above first embodiment except for the mode of the light path length control means 4. In view of this, the same reference numerals are attached to those constitutional elements that are common with the above first embodiment, and description of these elements is omitted accordingly.

Figure 8:
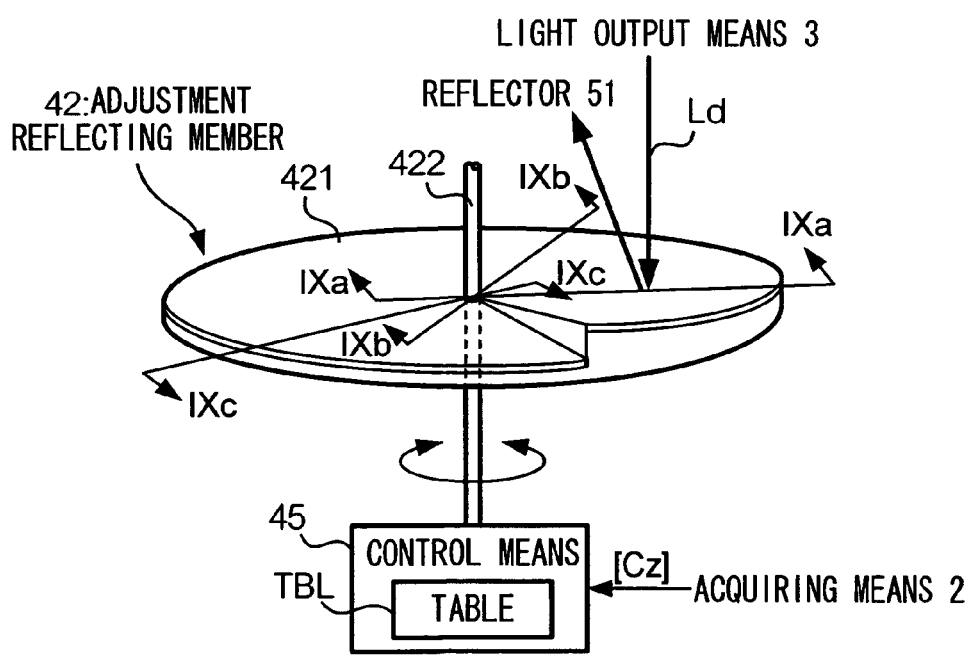
FIG. 8 shows the configuration of the light path length control means according to a second embodiment of the present invention.

FIG. 8 shows the configuration of the light path length control means 4 according to the present embodiment. An adjustment reflecting member 42 shown in this figure is, similarly to the adjustment reflecting member 41 in the above first embodiment, for guiding the pixel display light Ld output from the light output means 3 to the reflector 51 by reflecting the light. This adjustment reflecting member 42 is a disk-shaped member supported substantially horizontally so as be rotatable on a rotary shaft 422, and has a mirror surface 421 for mirror-reflecting pixel display light Ld that reaches the surface thereof. The control means 45 rotates the adjustment reflecting member 42 on the rotary shaft 422 by an angle that depends on the depth value Cz. For example, the control means 45 has a motor whose output shaft is coupled to the rotary shaft 422, and a circuit that controls the rotation angle of this output shaft to be at an angle that depends on the depth value Cz.

Figure 9A:
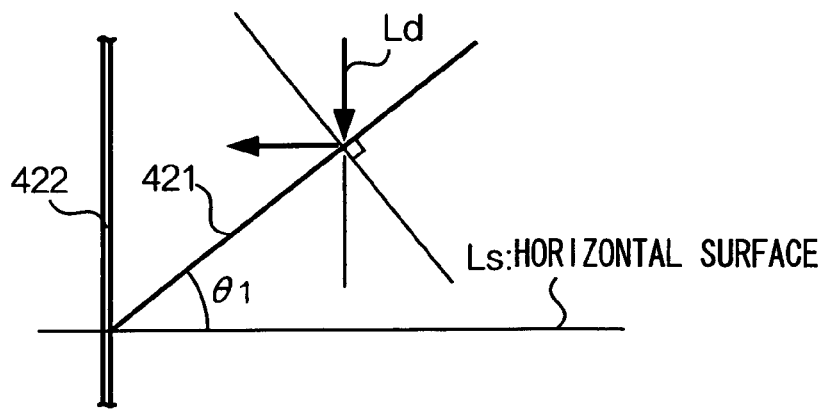
FIG. 9(*a*) is a cross-sectional view seen from an IXa-IXa line in FIG. 8.
Figure 9B:
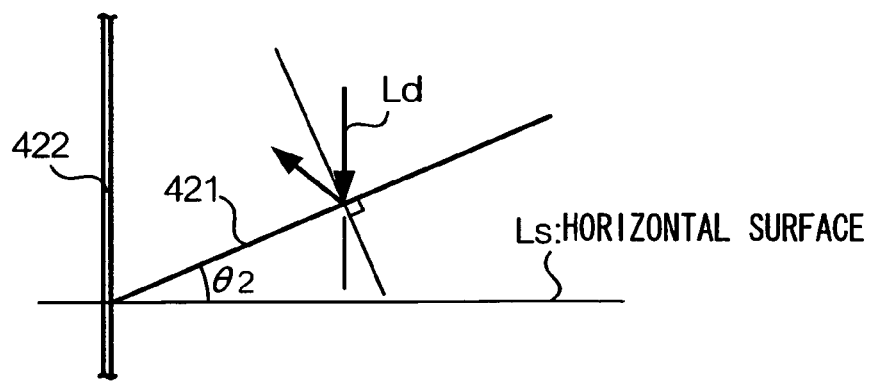
Figure 9C:
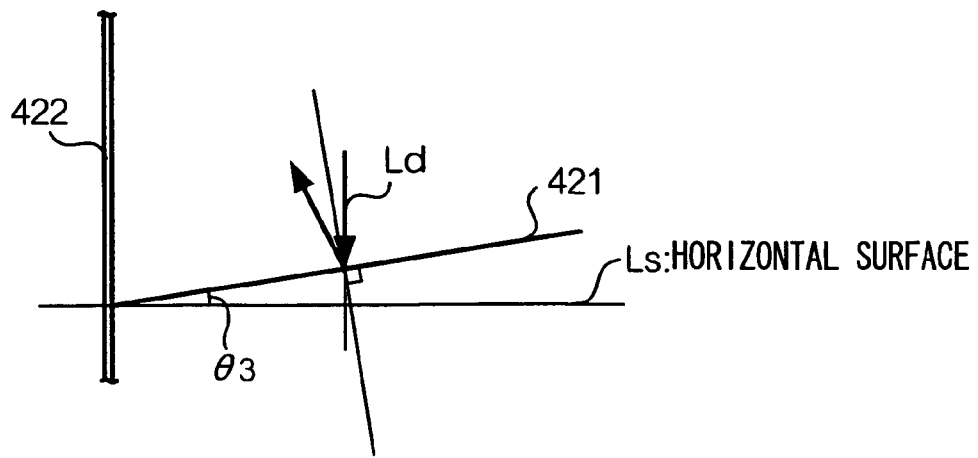

The surface of the adjustment reflecting member 42 has a substantially spiral shape whose angle relative to a horizontal surface changes continuously depending on the circumferential position. That is, in a cross-section seen from a line IXa-IXa in FIG. 8, the mirror surface 421 slopes at an angle $\theta 1$ relative to the horizontal surface Ls as shown in FIG. 9(a), while in a cross-section seen from a line IXb-IXb in FIG. 8, the mirror surface 421 slopes at an smaller angle $\theta 2$ than the angle $\theta 1$ relative to the horizontal surface Ls as shown in FIG. 9(b). Further, in a cross-section seen from a line IXc-IXc in FIG. 8, the mirror surface 421 slopes at an smaller angle $\theta 3$ than the angle $\theta 2$ relative to the horizontal surface Ls as shown in FIG. 9(c). The position at which the pixel display light Ld is output from the light output means 3 is fixed regardless of the rotation angle of the adjustment reflecting member 42, with the pixel display light Ld reaching the adjustment reflecting member 42 after traveling vertically downward. Consequently, the angle at which the pixel display light Ld is incident on the mirror surface 421 changes according to the rotation angle of the adjustment reflecting member 42 determined based on the depth value Cz, as shown in FIGS. 9(a) to 9(c). As a result, the pixel display light Ld is incident on the reflector 51 after traveling in a direction that depends on the rotation angle of the adjustment reflecting member 42 (i.e., a direction that depends on the depth value Cz), similarly to the first embodiment.

The control means 45 changes the rotation angle of the adjustment reflecting member 42 according to the depth value Cz, so that the number of times the pixel display light Ld is reflected in the reflector 51 increases the larger the depth value Cz. Elaborating further, rotation angles of the adjustment reflecting member 42 are specified in the table TBL in the present embodiment as the drive contents corresponding to the depth values Cz (see FIG. 5). The control means 45 retrieves the rotation angle associated with the depth value Cz input from the acquiring means 2 from the table TBL, and rotates the adjustment reflecting member 42 by this retrieved rotation angle. Note that the minute oscillation of the adjustment reflecting member 42 according to the depth value Cz (i.e., minute oscillation centered on the rotary shaft 422) so as to make the image Im of the pixel display light Ld extend over the entire unit area Au is similar to the above first embodiment.

In this way, similar effects to the first embodiment are obtained in the present embodiment because the number of times the pixel display light Ld is reflected is also controlled according to the depth value Cz. Further, because the reflected number of times can be changed according to the present embodiment by controlling the rotation angle of the adjustment reflecting member 42, the direction in which the pixel display light Ld travels can be adjusted with high accuracy and reliability using a simpler configuration than the above first embodiment.

C. Third Embodiment

The configuration of a projection display system DS according to a third embodiment of the present invention is described next. Note that the configuration of the projection display system DS according to the present embodiment is common with the above first embodiment except for the content of the table TBL. In view of this, the same reference numerals are attached to those constitutional elements that are common with the above first embodiment, and description of these elements is omitted accordingly.

Figure 10A:
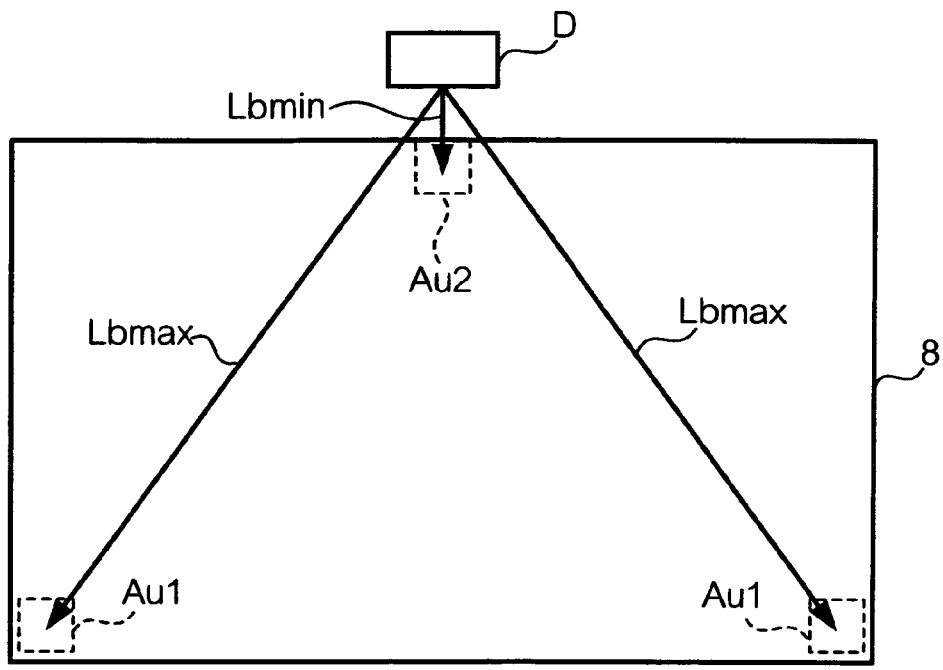
FIG. 10(*a*) is a front view showing the positional relation between a projection display device and a projection surface.
Figure 10B:
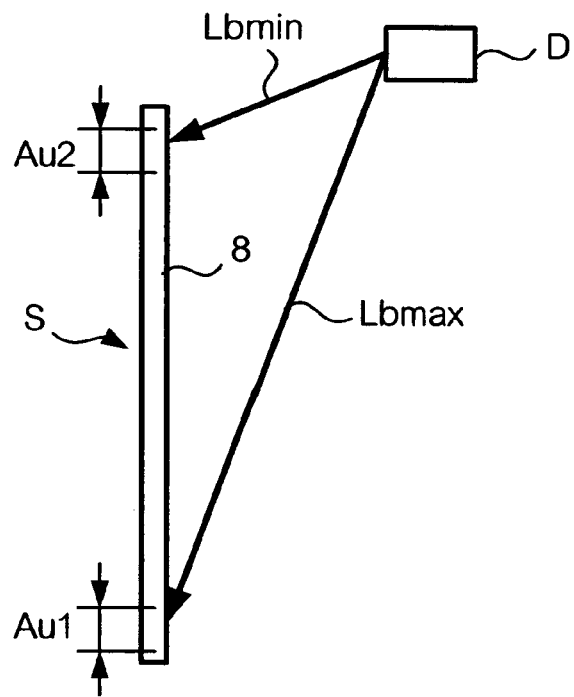

Based on the configuration according to the first embodiment, a light path length (hereinafter, "output light path length") Lb of the pixel display light Ld from the output reflecting member 58 to the projection surface 8 differs according to the positional relation between the unit area Au onto which the pixel display light Ld is projected and the output reflecting member 58. For example, assume a case in which the projection display device D is disposed diagonally above the horizontal center of the projection surface 8, as shown in FIGS. 10(a) and 10(b). Note that FIG. 10(b) equates to a figure viewing the projection surface 8 from the left side of FIG. 10(a). In this case, an output light path length Lbmax of the pixel display light Ld to unit areas Au1 positioned in the bottom left and right corners of the projection surface 8 (i.e., unit areas Au positioned farthest from the output reflecting member 58) is longer than an output light path length Lbmin of the pixel display light Ld to a unit area Au positioned at the top center of the projection surface 8 (i.e., unit area Au positioned closest to the output reflecting member 58). For this reason, even if the reflected number of times in the reflector 51 is changed according to the depth value Cz, the light path length of the pixel display light Ld from the light output means 3 to the projection surface 8 (i.e., total light path length including output light path length) may differ from the light path length that depends on the depth value Cz, according to the projected position of this pixel display light Ld. In this case, the viewer may be unable to perceive a natural sense of depth that directly reflects the depth value Cz. Particularly since the difference between the maximum output light path length Lbmax and the minimum output light path length Lbmin increases the larger the projection surface 8, this problem becomes all the more noticeable. The present embodiment is a mode for solving this problem.

As described above in relation to the first embodiment, drive contents for each depth value Cz are stored in the table TBL of the control means 45 so that the reflected number of times in the reflector 51 depends on the depth value Cz. In the present embodiment, furthermore, the drive contents of the table TBL are selected so that differences in the output light path length depending on the projected position of the pixel display light Ld of pixels are compensated. To elaborate is as follows.

Now, take "L(Cz)" as a light path length selected so as to only be proportional to the depth value Cz (the light path length from the light output means 3 to the projection surface 8 in the above first embodiment), without reflecting differences in the output light path length Lb, and take "Lbij" as the output light path length of the pixel in the ith row of the jth column (i.e., the distance from the output reflecting member 58 to the unit area Au in the ith row of the jth column). In the present embodiment, the drive contents of the table TBL are selected so that a light path length (hereinafter, "pre-projection light path length") La from the light output means 3 to the output reflecting member 58 via the adjustment reflecting member 41 and the reflector 51 equals the sum of the light path length L(Cz) that depends on the depth value Cz and a light path length differential ΔL obtained by subtracting the output light path length Lbij that depends on the pixel from the maximum output light path length Lbmax. That is, the angle θ of the adjustment reflecting member 41 is determined so that (pre-projection light path length La)=(light path length L(Cz) depending on depth value Cz)+(light path length differential ΔL)=(light path length L(Cz) depending on depth value Cz)+{(maximum output light path length Lbmax)−(light path length Lbij for each pixel)}, with the pixel display light Ld being incident on the reflector 51 at an angle of incidence that depends on this angle θ.

According to this configuration, a light path length (hereinafter, "total light path length") L of the pixel display light Ld for each pixel from the light output means 3 to the projection surface 8 is (total light path length L)=(pre-projection light path length La)+(light path length Lbij for each pixel)= (light path length L(Cz) depending on depth value Cz)+{(maximum output light path length Lbmax)−(output light path length Lbij for each pixel)}+(output light path length Lbij for each pixel)=(light path length L(Cz) depending on depth value Cz)+(maximum output light path length Lbmax). In this way, differences in the output light path length Lb for each pixel are compensated, since the total light path length L is the sum of the light path length L(Cz) that depends on the depth value Cz and the maximum output light path length Lbmax, irrespective of the position of the unit area Au onto which the pixel display light Ld is projected. That is, if the same depth value Cz is given to pixels, for example, the viewer U perceives a common sense of depth irrespective of the position of the pixels, since the total light path length L of respective pixel display light Ld is substantially the same, irrespective of the position of the unit areas Au onto which the respective pixel display light Ld is projected. That is, the control means 45 in the present embodiment functions to correct the light path length of pixel display light Ld corresponding to the pixels (more specifically, the reflected number of times in the reflector 51) according to the projected position of the pixel display light Ld.

Similar effects to the above embodiments are also obtained as a result of the present embodiment. In addition, the viewer U can be made to perceive a depth that directly reflects the depth value Cz of each pixel, since differences in the output light path length Lb that depend on the positional relation between the projection display device D and the projection surface 8 are compensated according to the present embodiment. Note that while the projection display device D according to the first embodiment is illustrated here, differences in the output light path length Lb can also be compensated using a similar configuration in the projection display device D according to the second embodiment.

Incidentally, the output light path length Lb is determined according to the positional relation between the projection display device D and the projection surface 8 (i.e., in particular, the distance between the output reflecting member 58 and each unit area Au). Consequently, the output light path length Lbij of the pixels and the maximum output light path length Lmax are selected in advance, having assumed that the projection display device D and the projection surface 8 are disposed in a prescribed relation, and the drive contents in the table TBL are selected in accordance with these light path lengths. Based on this configuration, however, differences in the output light path length Lb cannot be adequately compensated if the positional relation between the projection display device D and the projection surface 8 differs from the expected positional relation. Accordingly, a configuration can also be adopted in which the control means 45 identifies the positional relation between the projection display device D and the projection surface 8, and calculates the output light path length Lbij of the pixels and the maximum output light path length Lbmax for the identified positional relation, before selecting the drive contents of the table TBL according to these light path lengths. For example, a configuration can be adopted in which the control means 45 identifies the positional relation between the projection display device D and the projection surface 8 based on an instruction from the viewer U. According to this configuration, differences in the output light path length Lb can be adequately compensated regardless of the positional relation between the projection display device D and the projection surface 8.

Figure 11:
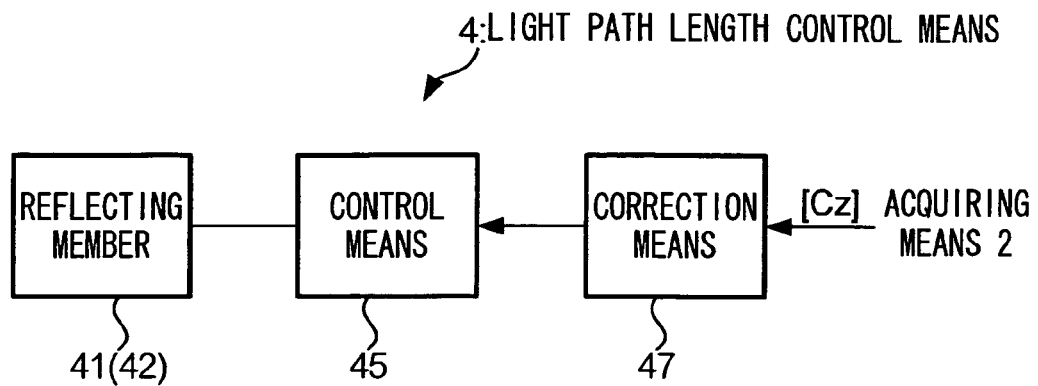
FIG. 11 is a block diagram showing the configuration of a light path length control means in another mode of a third embodiment of the present invention.

Note that while a configuration is illustrated in the present embodiment in which the drive content in the table TBL is selected so as to compensate for differences in the output light path length of pixels, the configuration compensating for differences in the output light path length is arbitrary. For example, a configuration can also be adopted in which the depth values Cz are corrected according to the position of the unit areas Au onto which the pixel display light Ld of pixels is projected. For example, a correction means 47 that corrects the depth values Cz output from the acquiring means 2 according to the position of the pixels may be provided upstream of the control means 45, as shown in FIG. 11. This correction means 47 corrects the depth values Cz input from the acquiring means 2 so that the depth values Cz decrease the longer the output light path length Lb (i.e., so that the depth values Cz increase the shorter the output light path length Lb). That is, with pixel display light Ld projected onto a unit area Au far from the projection display device D, the depth value Cz is substantively increased (the viewer U perceives greater depth) because of the longer output light path length Lb. Accordingly, in the configuration shown in FIG. 11, the increased sense of depth resulting from the pixel display light Ld traveling the output light path length Lb is subtracted in advance from the depth value Cz of the pixel. A natural sense of depth can also be realized with this configuration by compensating for differences in the output light path length Lb of the pixels.

D. Fourth Embodiment

The configuration of a projection display system DS according to a fourth embodiment of the present invention is described next. A configuration was illustrated in the above first embodiment in which an image Im of the pixel display light Ld is made to extend over the entire unit area Au by making the traveling direction of the pixel display light Ld oscillate minutely in the case of large depth values Cz. In contrast, in the present embodiment, the image Im is made to extend over the entire unit area Au by adjusting the light flux cross-sectional area of pixel display light Ld output from the light output means 3 according to the depth value Cz. Note that the configuration of the projection display system DS according to the present embodiment is common with the above first embodiment except for the configuration for solving the reduction in light flux cross-sectional area in the light path length of the pixel display light Ld. In view of this, the same reference numerals are attached to those constitutional elements that are common with the above first embodiment, and description of these elements is omitted accordingly.

Figure 12:
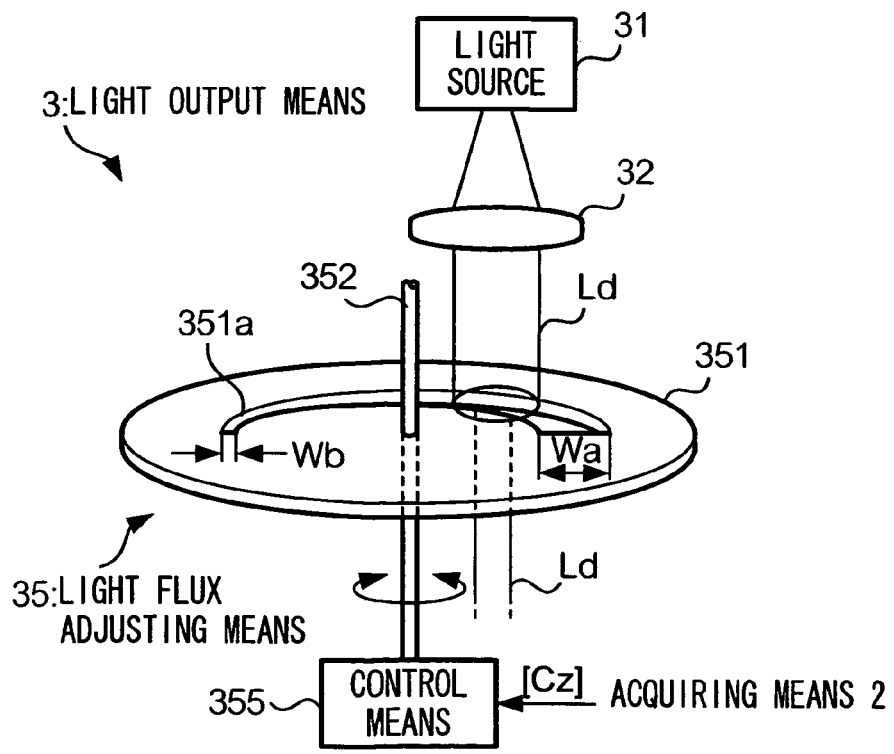
FIG. 12 shows the configuration of a light output means in a projection display system according to a fourth embodiment of the present invention.

As shown in FIG. 12, the light output means 3 of the present embodiment includes a light flux adjusting means 35 in addition to the same light source 31 and lens 32 as the above first embodiment. This light flux adjusting means 35 adjusts the light flux cross-sectional area of the parallel pixel display light Ld output from the lens 32 according to the depth value Cz output from the acquiring means 2. Elaborating further, the light flux adjusting means 35 has a plate member 351 and a control means 355. The plate member 351 is a disc-shaped member supported substantially horizontally so as to be rotatable on a rotary shaft 352, and at least the plate surface opposing the lens 32 is made from a material that does not allow light to pass (material having light reflectivity or light absorbency). Further, the plate member 351 has a slit 351a that extends circumferentially around the rotary shaft 352. The slit 351a is formed so that a slit width W changes continuously according to the circumferential position. As shown in FIG. 12, for example, a slit width Wa at one end of the slit 351a is larger than a slit width Wb at the other end. The control means 355 rotates the plate member 351 on the rotary shaft 352 by an angle that depends on the depth value Cz. For example, the control means 355 has a motor whose output shaft is coupled to the rotary shaft 352, and a circuit that controls the rotation angle of this output shaft to be at an angle that depends on the depth value Cz.

Although the position at which the pixel display light Ld is output from the light source 31 and the lens 32 is also fixed in the present embodiment, similarly to the above first embodiment, the light flux cross-sectional area of the pixel display light Ld output from the lens 32 is larger than the above first embodiment. The plate member 351 is provided so as to intersect the pixel display light Ld output from the lens 32, and the slit 351a is formed at a position through which the optical axis of the lens 32 passes in a radial direction around the rotary shaft 352. Consequently, part of the pixel display light Ld irradiated from the lens 32 onto the plate member 351 selectively passes through the slit 351a and is incident on the light path length control means 4, while the remaining light is absorbed or reflected by the surface of the plate member 351. Because the slit width W changes continuously in a circumferential direction as described above, the light flux cross-sectional area of the pixel display light Ld that is incident on the light path length control means 4 after passing through the slit 351a changes according to the rotation angle of the plate member 351.

Based on this configuration, the control means 355 changes the rotation angle of the plate member 351 so that the light flux cross-sectional area of the pixel display light Ld incident on the light path length control means 4 depends on the depth value Cz. For example, the control means 355 rotates the plate member 351 according to the depth value Cz, so that the light flux cross-sectional area of the pixel display light Ld increases the larger the depth value Cz (i.e., so that the light flux cross-sectional area of the pixel display light Ld decreases the smaller the depth value Cz). Here, the maximum slit width Wa of the slit 351a in the case of the largest depth value Cz (i.e., the reflected number of times in the reflector 51 is maximized) is selected so that the image Im of pixel display light Ld that reaches the projection surface 8 after passing through this portion extends over the entire unit area Au. The minimum slit width Wb of the slit 351a in the case of the smallest depth value Cz (i.e., the reflected number of times in the reflector 51 is minimized) is selected so that the image Im of the pixel display light Ld that reaches the projection surface 8 after passing through this portion fits within the unit area Au. Consequently, the image Im of the pixel display light Ld that reaches the projection surface 8 extends over the entire unit area Au irrespective of the depth value Cz (i.e., irrespective of the reflected number of times in the reflector 51), as a result the rotation angle of the plate member 351 being controlled according to the depth value Cz. Note that the configuration in which the control means 355 controls the rotation angle of the plate member 351 according to the depth value Cz is arbitrary. For example, a configuration can also be adopted whereby a table in which depth values Cz are associated with rotation angles is prestored, and the plate member 351 is controlled so as to rotate to the rotation angle associated with the depth value Cz input from the acquiring means 2, or whereby the rotation angle of the plate member 351 is calculated by performing a prescribed operation on the depth value Cz input from the acquiring means 2, and the plate member 351 is driven so as to rotate to the calculated rotation angle.

According to the present embodiment, a drop in display quality is suppressed because of being able to make the image Im of pixel display light Ld extend over the entire unit area Au irrespective of the reflected number of times in the reflector 51, in addition to obtaining similar effects to the above first embodiment. Also, given that the above first embodiment requires a configuration for making the adjustment reflecting member 41 oscillate minutely, the present embodiment is advantageous in that the above effect is achieved using a simple configuration in which the rotation angle of the plate member 351 is controlled according to the depth value Cz. Note that while the projection display device D according to the first embodiment is illustrated here, a drop in display quality is also suppressed using a similar configuration in the projection display devices D according to the second and third embodiments. Also, the light flux adjusting means 35 according to the present embodiment may also be provided in addition to a configuration for making the adjustment reflecting member 41 (or the adjustment reflecting member 42 of the first embodiment) oscillate according to the depth value as in the above first embodiment.

E. Fifth Embodiment

The configuration of a projection display system DS according to a fifth embodiment of the present invention is described next. The configuration of the projection display system DS according to the present embodiment is common with the above first embodiment except for the configuration of the screen S. In view of this, the same reference numerals are attached to those constitutional elements that are common with the above first embodiment, and description of these elements is omitted accordingly.

The angle at which the pixel display light Ld reflected by the output reflecting member 58 is incident on the first mirror surface 81 of the projection surface 8 differs according to the positional relation between the projection display device D and the projection surface 8. When the positional relation between the projection display device D and the projection surface 8 is as shown in FIGS. 10(a) and 10(b), for example, the angle at which the pixel display light Ld is incident on the first mirror surface 81 in the unit areas Au1 positioned in the bottom left and right corners of the projection surface 8 (angle formed by the normal line of the first mirror surface 81 and the direction of incidence) is larger than the angle at which the pixel display light Ld is incident on the first mirror surface 81 in the unit area Au2 positioned at the horizontal center of the projection surface 8. For this reason, based on a configuration in which the first mirror surface 81 is a uniformly planar surface which is substantially parallel with a horizontal surface as in the above first embodiment, differences in the traveling direction of pixel display light Ld output from the first mirror surface 81 via the second mirror surface 82 may occur depending on the position on the projection surface 8. Since the intensity and direction of light output on the viewing side varies for every position on the projection surface 8, the viewer U in this case perceives this as display unevenness of the image. In particular, this problem becomes all the more noticeable if a large screen S is used, since the angles of incidence of the pixel display light Ld on the first mirror surface 81 vary greatly depending on the position on the projection surface 8. The present embodiment is a mode for solving this problem. Note that in the following description, a case is assumed in which the projection display device D and the screen S are in the positional relation shown in FIGS. 10(a) and 10(b).

Figure 13A:
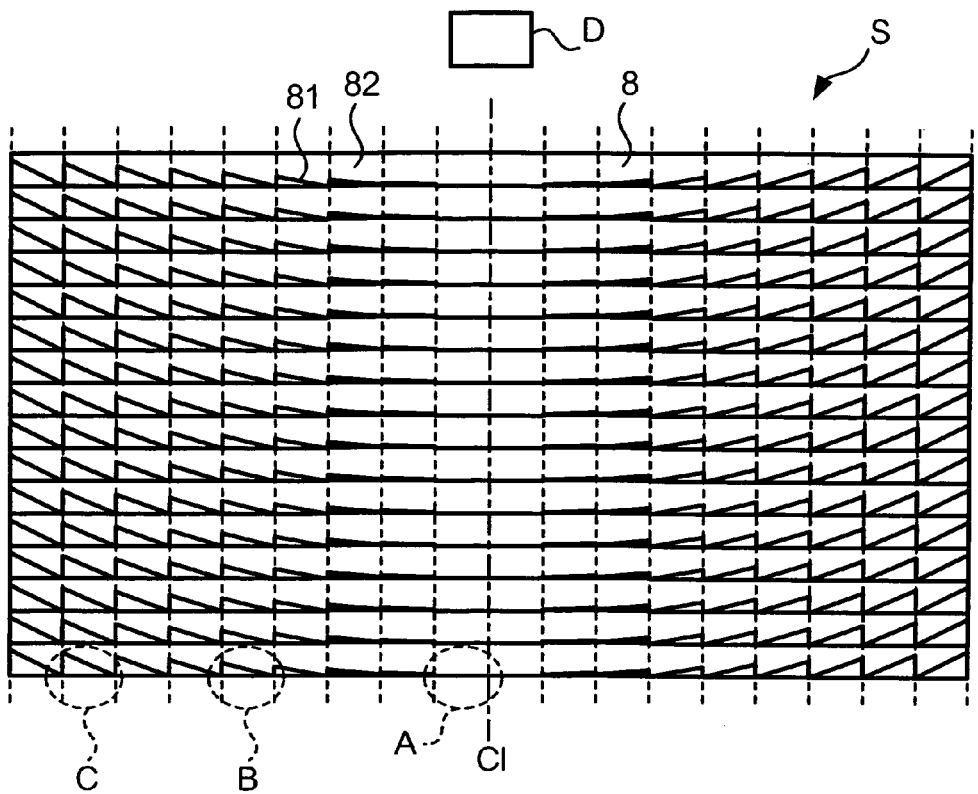
FIG. 13(*a*) is a front view showing the configuration of a screen in a projection display system according to a fifth embodiment of the present invention.

FIG. 13(a) is a plan diagram showing the configuration of the screen S of the present embodiment seen from the front of the projection surface 8.

Figure 13B:
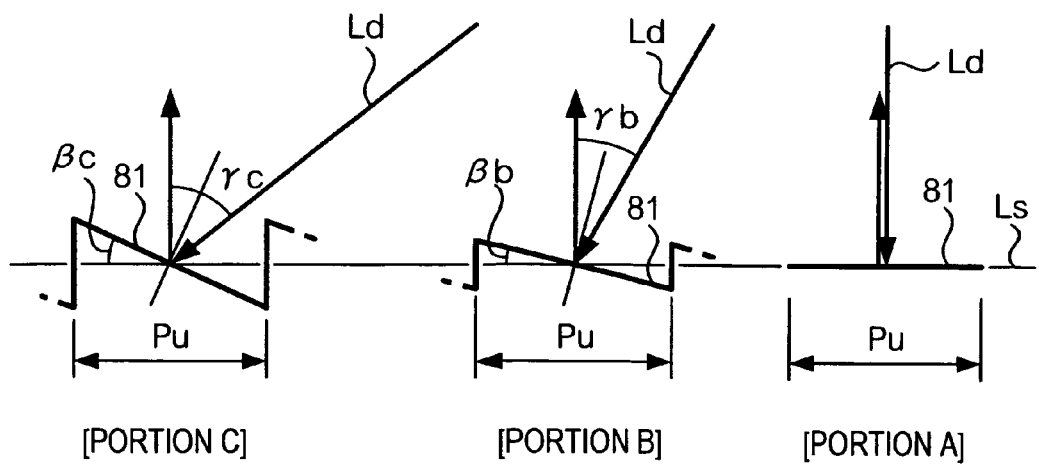

FIG. 13(b) shows enlarged views of the portions circled with broken lines in FIG. 13(a). Note that while only portions on the left side of the projection surface 8 from the centerline are shown in FIG. 13(b), portions on the right side of the projection surface 8 have a symmetrical configuration about the centerline Cl. As shown in these diagrams, the screen S in the present embodiment is common with the screen S of the above first embodiment in terms of having a projection surface 8 composed of a first mirror surface 81 and a second mirror surface 82 disposed alternately. However, the angle formed by the first mirror surface 81 and the horizontal surface Ls differs depending on the position on the projection surface 8.

As shown in FIG. 13(b), the first mirror surface 81 is divided horizontally into a plurality of portions Pu (hereinafter, "unit portions"). Note that while portions obtained by dividing the first mirror surface 81 per unit area Au may be used as the unit portions Pu, the dimension of the unit portions Pu may be selected independently of the unit areas Au. An angle β that the surface of each unit portion Pu (i.e., the first mirror surface 81) forms with the horizontal surface Ls (e.g., βb, βc) is selected for every unit portion Pu according to the angle of incidence of the pixel display light Ld on respective unit portions Pu. More specifically, the angle β formed with the horizontal surface Ls is selected for each unit portion Pu, so that the reflected light of the unit portion Pu is output parallel on the viewing side after being reflected by the second mirror surface 82. For example, assume a case in which the reflected light of the first mirror surface 81 reaches the second mirror surface 82 after traveling perpendicularly, seen from a direction perpendicular to the projection surface 8. Because the pixel display light Ld is incident on the unit portion Pu shown in portion A of FIG. 13(a) in a direction substantially perpendicular to the horizontal surface Ls, this unit portion Pu is a plane which is substantially parallel with the horizontal surface Ls as shown in portion A of FIG. 13(b). The pixel display light Ld is incident on the unit portion Pu shown in portion B of FIG. 13(a) in a direction forming an angle γb with the normal of the horizontal surface Ls, as shown in portion B of FIG. 13(b). For this reason, the unit portion Pu shown of portion B is a planar surface forming an angle βb with the horizontal surface Ls. The angle βb of portion B is roughly half of the angle γb of the pixel display light Ld, as is clear from FIG. 13(b). For the same reason, an angle βc that the unit portion Pu shown in portion C of FIG. 13(b) forms with the horizontal surface Ls is roughly half of an angle γc which pixel display light Ld reaching this portion forms with the normal of the horizontal surface Ls. Because the angle γ (e.g., γb, γc) that the pixel display light Ld reaching each unit portion Pu makes with the normal of the horizontal surface Ls increases the further the position from the centerline Cl of the projection surface 8, the angle β that each unit portion Pu forms with the horizontal surface Ls is selected so as to increase the further the position from the centerline Cl of the projection surface 8. Note that while the slope of the unit portions Pu in the horizontal direction of the projection surface 8 is illustrated here, the slope of the unit portions Pu in the anteroposterior direction of the projection surface 8 is also selected based on a similar viewpoint. That is, in the case where the projection display device D is disposed diagonally above the projection surface 8 as in the present embodiment, the anteroposterior angle that each unit portion Pu forms with the horizontal surface Ls is selected so as to increase the closer the position to the bottom of the projection surface 8 (to decrease the closer the position to the top of the projection surface 8).

In this way, in the present embodiment, the display quality of an image seen by the viewer U can be homogenized in all portions of the projection surface 8 because of being able to output the pixel display light Ld in an anticipated direction on the viewing side, irrespective of the position on the projection surface 8. In other words, the projection surface 8 can be enlarged while maintaining the display quality at a high level at which display unevenness is suppressed. Note that while the projection display device D according to the first embodiment is illustrated here, display unevenness can also be suppressed using a similar configuration in the projection display devices D according to the second to fourth embodiments.

Incidentally, a configuration is illustrated here in which the angles of the unit portions Pu are fixed in advance, having assumed that the projection display device D and the projection surface 8 are in an expected positional relation. However, based on this configuration, display unevenness may not be adequately suppressed if the positional relation of the projection display device D and the projection surface 8 differs from the expected positional relation. Accordingly, a configuration is possible in which the angles of the unit portions Pu in the projection surface 8 are adjusted arbitrarily. For example, a configuration can be adopted in which the projection surface 8 is constituted by arranging a large number of micro-mirror elements in sheets, and a control means that is not shown individually controls the angle of micro mirrors in the micromirror elements. Based on this configuration, once the viewer has input the positional relation between the projection display device D and the projection surface 8, the control means calculates the angle of incidence of the pixel display light Ld for each unit portion Pu of the projection surface 8 based on the input positional relation, and adjusts the angle of the micro mirrors according to these angles of incidence. According to this configuration, display unevenness in the projection surface 8 can be adequately suppressed, regardless of the positional relation between the projection display device D and the projection surface 8.

F. Sixth Embodiment

The configuration of a projection display system DS according to a sixth embodiment of the present invention is described next. The configuration of the projection display system DS according to the present embodiment is common with the above first embodiment except for the configuration of the screen S. In view of this, the same reference numerals are attached to those constitutional elements that are common with the above first embodiment, and description of these elements is omitted accordingly.

Based on a configuration in which the second mirror surface 82 is a plane as shown in the above first embodiment (see FIG. 1), a viewer positioned in front of the screen S is able view the anticipated image with a sense of three-dimensionality, since the incident light from the first mirror surface 81 reaches the viewer after being reflected in the direction of the normal of the projection surface 8. However, if the viewer views the image displayed on the screen S from a diagonal direction (diagonally from the left/right or above/below), the viewer may not be able to see the image because the light reflected by the screen S is not output in that direction or because of insufficient light intensity.

Figure 14A:
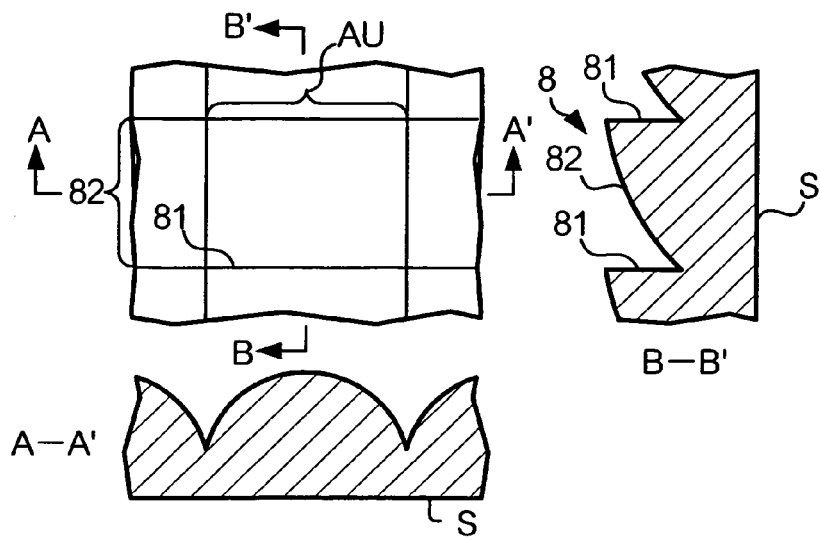
FIG. 14(*a*) is a front view and end views showing the configuration of a second mirror surface of the screen in a projection display system according to a sixth embodiment of the present invention.

This drawback is solved in the present embodiment by making the second mirror surface 82 a curved surface for every unit area Au, as shown in FIG. 14(a). Note that FIG. 14(a) collectively illustrates a front view of the first mirror surface 81 and the second mirror surface 82 seen from a direction perpendicular to the projection surface 8 (i.e, the horizontal direction), an end view of these mirrors fractured at a vertical cross-section (B-B' line cross-section), and an end view seen from a horizontal cross-section (C-C' line cross-section). As shown in this figure, the second mirror surface 82 corresponding to each unit area Au is a smooth curve, a vicinity of the center of which protrudes more on the viewing side than the periphery thereof (i.e., a surface in which the periphery of a cross-section thereof in either the horizontal or vertical directions forms a curve). Because incident light from the first mirror surface 81 is output not only in the direction of the normal of the screen S but dispersedly over a wide area (e.g., diagonally seen from the screen S) according to this configuration, sufficient reflected light that depends on the display image is also made to reach a viewer of the screen S diagonally.

Figure 14B:
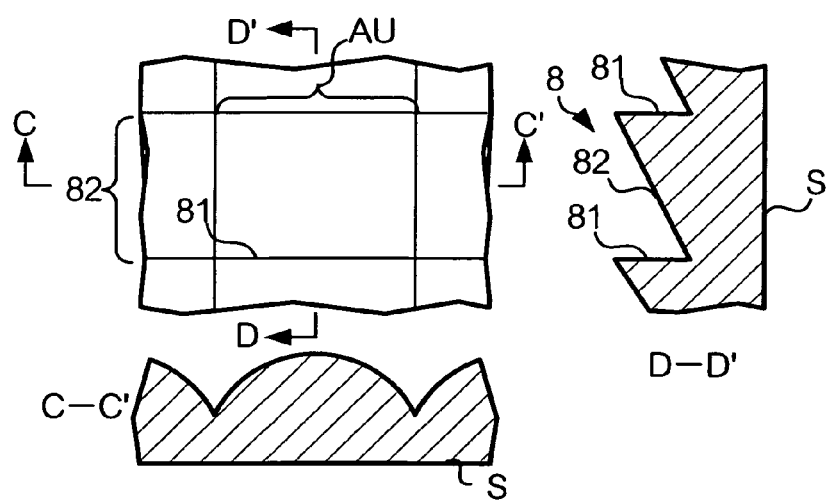
Figure 14C:
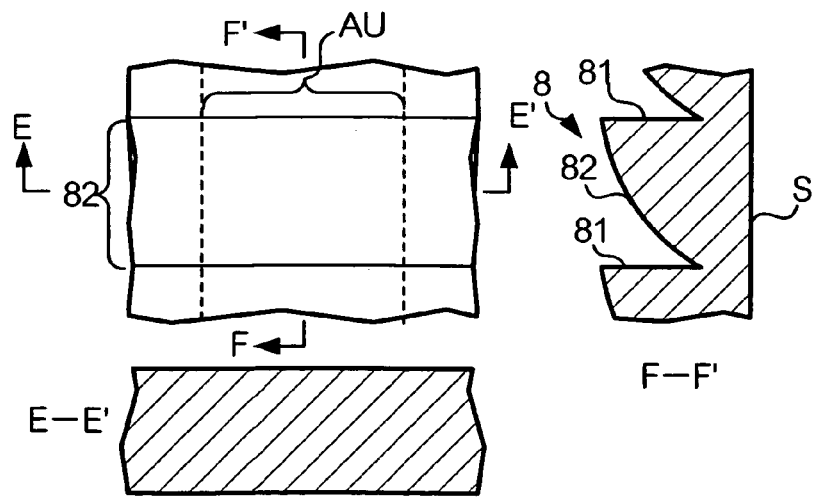

Note that while a case was assumed here in which the viewer views the image diagonally from the left/right or above/below relative to the normal of the screen S, there is little necessity to reflect light upwards or downwards relative to the normal of the screen S provided that the position of the viewer above or below the screen S is substantially fixed. Accordingly, the surface of the second mirror surface 82 in this case may be a curve with only horizontal curvature, as shown in FIG. 14(b), instead of the configuration shown in FIG. 14(a) (i.e., only the periphery of the horizontal cross-section (line C-C') forms a curve, while the periphery of the vertical cross-section (line D-D') is a straight line). According to this configuration, because incident light from the first mirror surface 81 can be output dispersedly in a direction forming a horizontal angle with the normal of the screen S (i.e., diagonally to the left/right seen from the screen S), sufficient reflected light that depends on the display image can also be made to reach a viewer of the screen S diagonally from the left or right. Also, in the case where light is output diagonally upwards or downwards relative to the normal of the screen S, the surface of the second mirror surface 82 may be a curve with only vertical curvature, as shown in FIG. 14C (i.e., only the periphery of the vertical cross-section (line F-F') forms a curve, while the periphery of the horizontal cross-section (line E-E') is a straight line).

G. Seventh Embodiment

Figure 15:
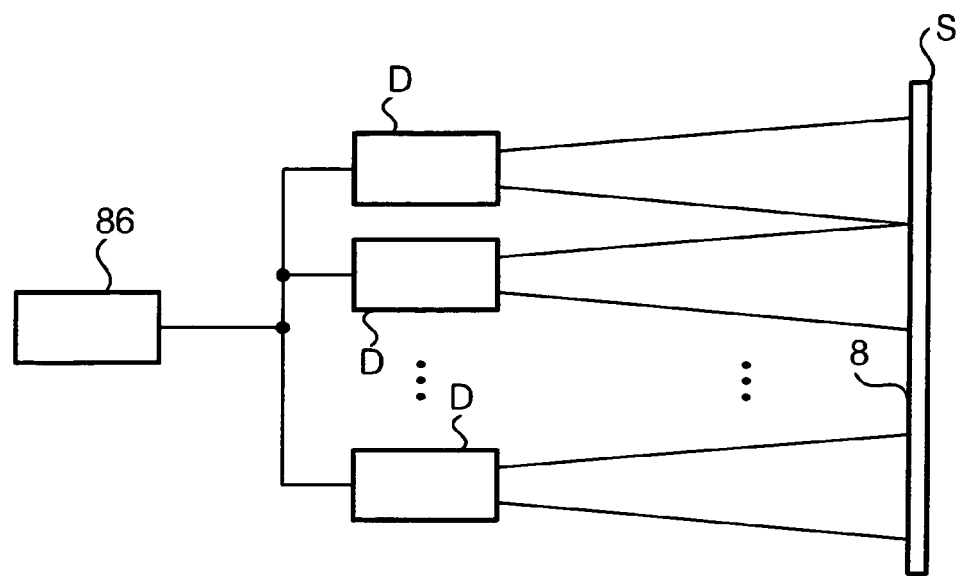
FIG. 15 is a block diagram showing the configuration of a projection display system according to a seventh embodiment of the present invention.

While a configuration was illustrated in the above embodiments in which an image is projected onto a single projection surface 8 by a single projection display device D, the correspondence relation between the projection surface 8 and the projection display device D is arbitrary. In a projection display system DS of the present embodiment, a plurality of projection display devices D project images onto a single projection surface 8 (screen S), as shown in FIG. 15. Note that the same reference numerals are attached to those constitutional elements that are common with the above first embodiment, and description of these elements is omitted accordingly.

In this configuration, the projection display devices D project an image onto each of a plurality of areas into which the projection surface 8 is divided. According to this configuration, it is possible to enlarge the projection surface 8 in comparison to when only a single projection display device D is used. Note that while a configuration can also be adopted in which each projection display device D independently includes all of the constitutional elements shown in FIG. 1, a configuration is possible in which a management device 86 is provided for comprehensively managing the operation of the projection display devices D, as shown in FIG. 15. This management device 86 includes the storage means 1, the acquiring means 2 and the control means 45 out of the constitutional elements shown in FIG. 1, and outputs pixel values Cg and depth values Cz to the projection display devices D. Each projection display device D shown in FIG. 15 has the light output means 3, the adjustment reflecting member 41, and the light guide body 5. According to this configuration, the storage means 1, the acquiring means 2 and the control means 45 do not need to be set up independently for each projection display device D, thereby allowing for simplification of the configuration and reduction of manufacturing costs. Also, the entire screen S does not necessarily need to be integrated. For example, the projection surface 8 can be easily enlarged if a screen S composed of a plurality of interlinked portions is used. A projection display system DS that displays an image using any of the modes shown below, for example, may also be realized if a configuration is applied in which a plurality of projection display devices D project images onto a single projection surface 8, as shown in FIG. 15.

G-1. First Mode

Figure 16:
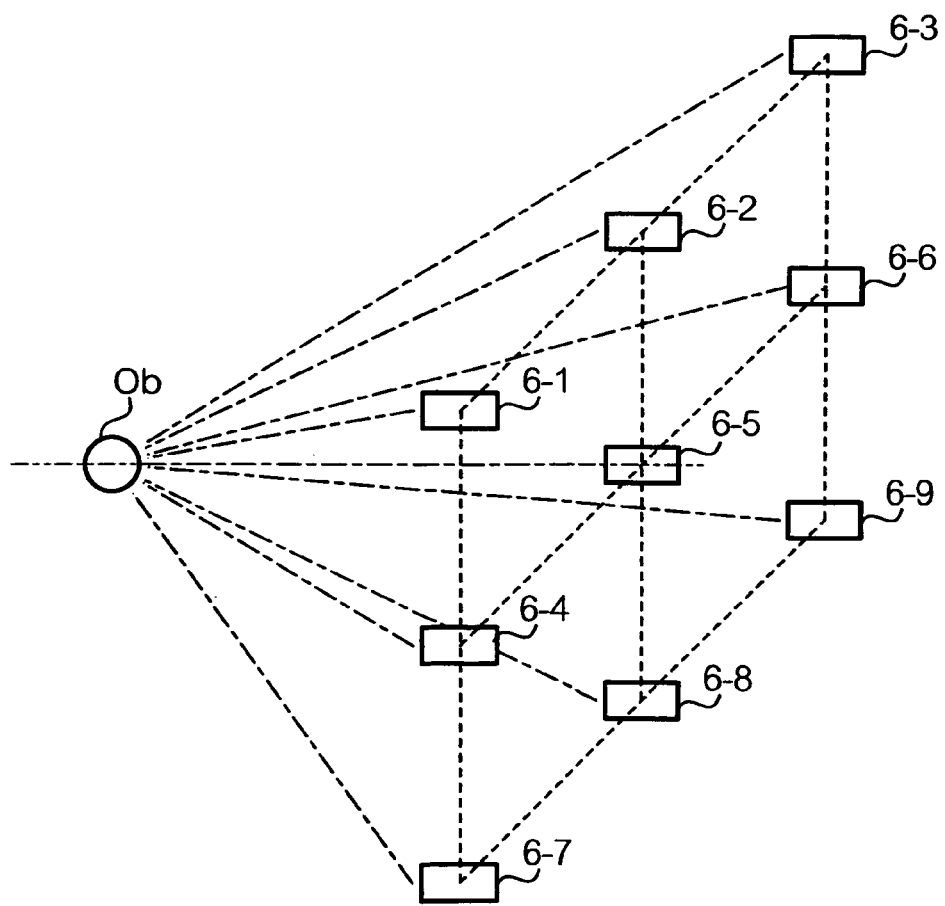
FIG. 16 shows the imaging of an image for use in a projection display system according to a first mode of the seventh embodiment.

In the present mode, nine types of images having a common object are respectively projected onto the projection surface 8 of the screen S from a total of nine projection display devices D. The nine types of images are generated by imaging the common object Ob using a total of nine imaging devices 6 (6-1, 6-2, 6-3, 6-4, 6-5, 6-6, 6-7, 6-8 and 6-9), as shown in FIG. 16. These imaging devices 6 are disposed in different positions from each other seen from the object Ob (in particular, the directions seen from the object Ob are different from each other). That is, the imaging device 6-1 is disposed diagonally to the upper left of the object Ob facing the object Ob, the imaging device 6-2 is disposed diagonally above the object Ob, the imaging device 6-3 is disposed diagonally to the upper right of the object Ob, the imaging device 6-4 is disposed diagonally to the right of the object Ob, the imaging device 6-5 is disposed in front of the object Ob, the imaging device 6-6 is disposed diagonally to the left of the object Ob, the imaging device 6-7 is disposed diagonally to the bottom left of the object Ob, the imaging device 6-8 is disposed diagonally below the object Ob, and the imaging device 6-9 is disposed diagonally to the bottom right of the object Ob. The images taken by these imaging devices are respectively input to different projection display devices D and projected onto the projection surface 8. The projection display devices D project the images onto the projection surface 8 from positions corresponding to the positions of the imaging devices 6 during the imaging. That is, the projection display device D input with an image taken by the imaging device 6-1 projects the image diagonally from the upper left of the projection surface 8, the projection display device D input with an image taken by the imaging device 6-2 projects the image from diagonally above the projection surface 8, and the projection display device D input with an image taken by the imaging device 6-3 projects the image diagonally from the upper right of the projection surface 8. The positions of the other projection display devices D are also similarly selected according to the positions of the imaging devices 6. According to the projection display system DS of the present mode, the viewer can be made to perceived images having a natural sense of three-dimensionality irrespective of the position of the viewer relative to the projection surface 8, since the reflected light of images taken of the object Ob from various positions reaches the viewer situated at these positions relative to the projection surface 8.

Note that while a configuration is illustrated here in which images taken of a common object Ob are projected onto the projection surface 8 from the projection display devices D, separate images may be projected from each projection display device D. For example, various images such as the images of programs on various channels provided by a television broadcast, or images output from an image playback device such as a video tape recorder may be respectively projected onto the projection surface 8 from separate projection display devices. According to this configuration, different images can be seen depending on the position of the viewer relative to the projection surface 8. Also, while a configuration is illustrated in FIG. 16 in which an object Ob is imaged from nine imaging devices 6, the number of imaging devices 6 is arbitrary. Consequently, the number of the projection display device D for projecting images taken by the imaging devices 6 onto the screen S is also arbitrary.

G-2. Second Mode

Figure 17:
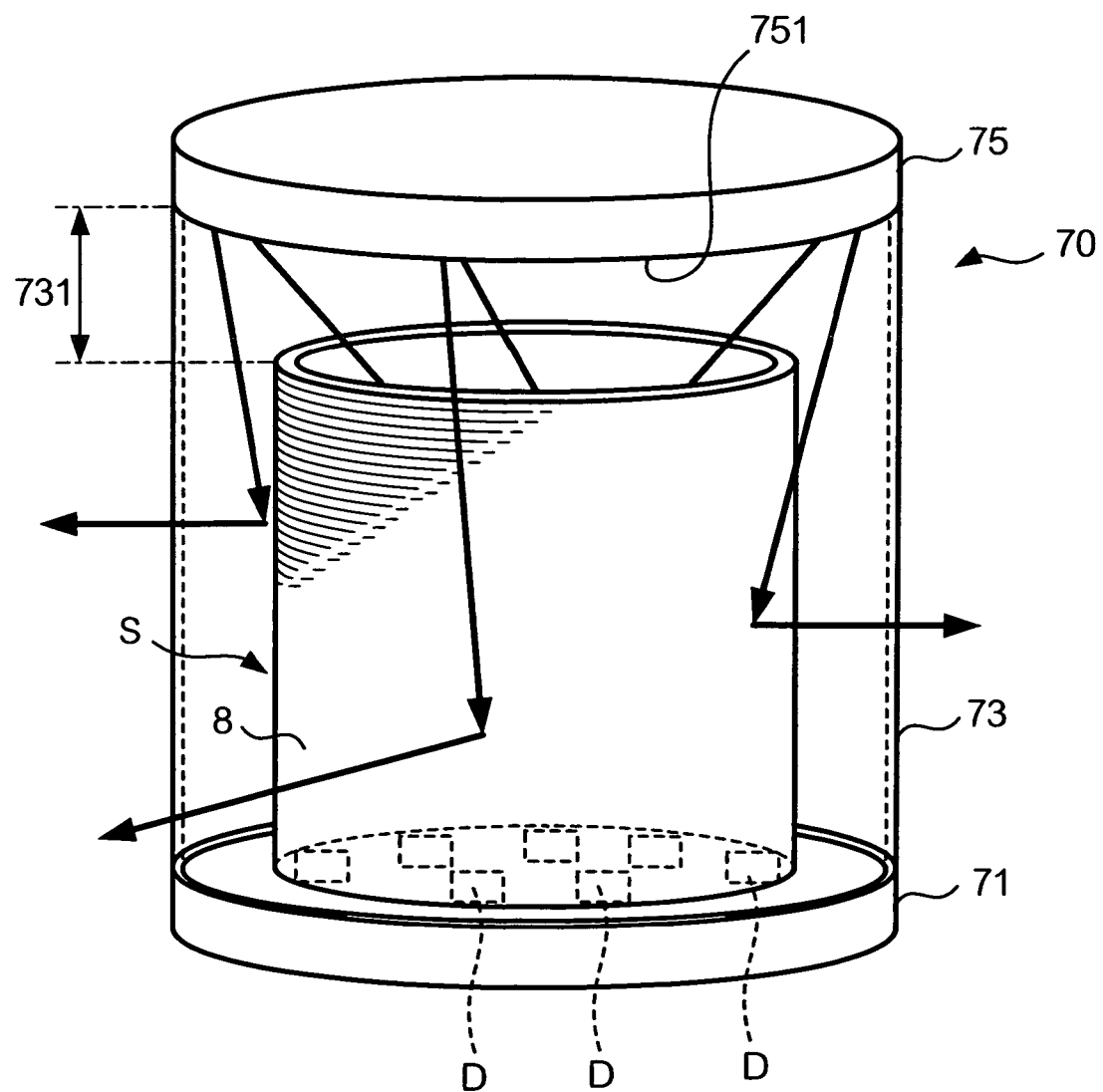
FIG. 17 is a perspective view showing the configuration of a projection display system according to a second mode of the seventh present invention.

While a configuration was illustrated in the above embodiments in which the projection surface 8 is a substantially planar surface, a projection display system DS according to the present mode includes a substantially cylindrical screen S whose projection surface 8 is a curved surface as shown in FIG. 17, and has an outer shape that is substantially columnar as a whole. As shown in this figure, the projection display system DS has a hollow casing 70. This casing 70 is composed of a substantially disk-shaped support base 71 set on the floor, a substantially cylindrical protective member 73 that is fixed to the support base 71 and stands vertically upright so that one of the substantially annular end faces follows the periphery of the upper surface of the support base 71, and a support cover 75 fixed to the other end face of the protective member 73 so as to block the opening of the protective member 73. The protective member 73 is formed using a material with optical transparency (i.e., transparent member), with the viewer being able to see inside the casing 70 through the protective member 73. The support base 71 and the support cover 75 do not have optical transparency (i.e., opaque members). The plate surface of the support cover 75 opposing the support base 71 is a reflecting surface 751 having light reflectivity (i.e., plate surface facing vertically downward). For example, a reflecting plate is stuck to the plate surface of the support cover 75 opposing the support plate 71.

The screen S formed into a substantially cylindrical shape is housed inside this casing 70, with the outer surface of this screen S (i.e., the plate surface opposing the protective member 73) forming the projection surface 8. Further, a plurality of projection display devices D are disposed on the inside of the substantially cylindrical screen S. The projection display devices D are disposed on the upper surface of the support base 71 so that light output from the output reflecting member 58 reaches the reflecting surface 751 of the support cover 75. Based on this configuration, light output from the projection display devices D reaches the projection surface 8 of the screen S after being reflected by the reflecting surface 751 of the support cover 75, and from there the light passes through the protective member 73 and is output to the outside of the casing 70. A viewer situated outside the casing 70 perceives an image with a sense of three-dimensionality as a result of seeing this output light. Here, the position and orientation of each of the plurality of projection display devices D are selected so that light output from each device is irradiated dispersedly onto the projection surface 8 of the screen S, or more preferably, so that the light is irradiated over the entire projection surface 8 of the screen S. According to this configuration, the user is able to see an image having a sense of three-dimensionality for 360 degrees around the casing 70.

Note that while the above protective member 73 constituting the lateral face of the casing 70 is made entirely of a transparent material in FIG. 17, a portion 731 corresponding to a segment of the protective member 73 from the upper end face of the screen S to the support cover 75 may be opaque. For example, a configuration can be adopted in which the portion 731 of the configuration shown in FIG. 17 is covered with a member that does not have optical transparency (i.e., a member having opacity). According to this configuration, the visibility of the display image on the projection surface 8 can be improved because of being able to block light that is reflected by the reflecting surface 751 and travels to the outside of the casing 70 without passing via the projection surface 8.

Also, while a configuration is illustrated here in which an image is viewed from outside the screen S, a configuration can also be adopted in which the viewer views the image from inside the screen S, after having made the screen S large enough for the viewer to go inside. In this configuration, the inner surface of the screen (i.e., the plate surface on the opposite side to the plate surface opposing the protective member) forms the projection surface 8, and the plurality of projection display devices D are disposed so that light output from the projection display devices D reaches the projection surface 8 via the reflecting surface. Note that a configuration is possible in which the projection display devices D are disposed outside the screen S (i.e., in the space sandwiched between the outer surface of the screen S and the protective member). Also, while a configuration is illustrated in the present mode in which the screen S is housed in a casing, this casing can be omitted accordingly.

H. Modifications

Various modifications can be made to the above embodiments. The modes of specific modifications are as follows. Note that a configuration can also be adopted in which the above embodiments and the following modes are combined accordingly.

Figure 18A:
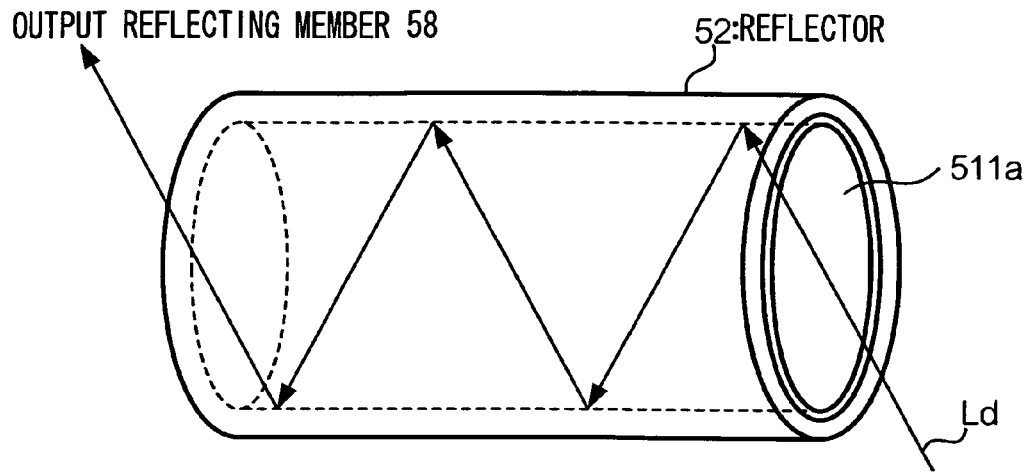
FIG. 18(*a*) is a perspective view showing the configuration of a reflector according to a modification 1.
Figure 18B:
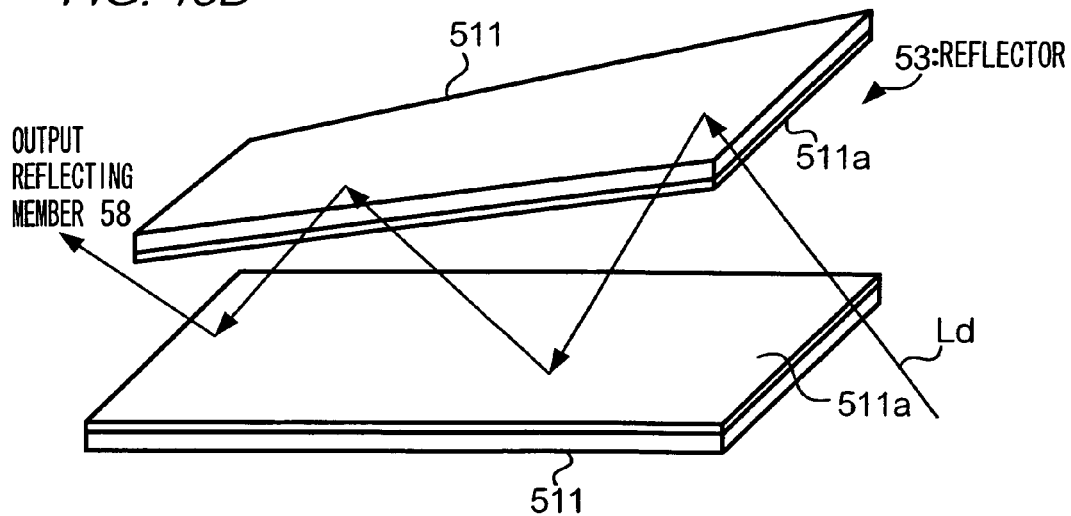
Figure 18C:
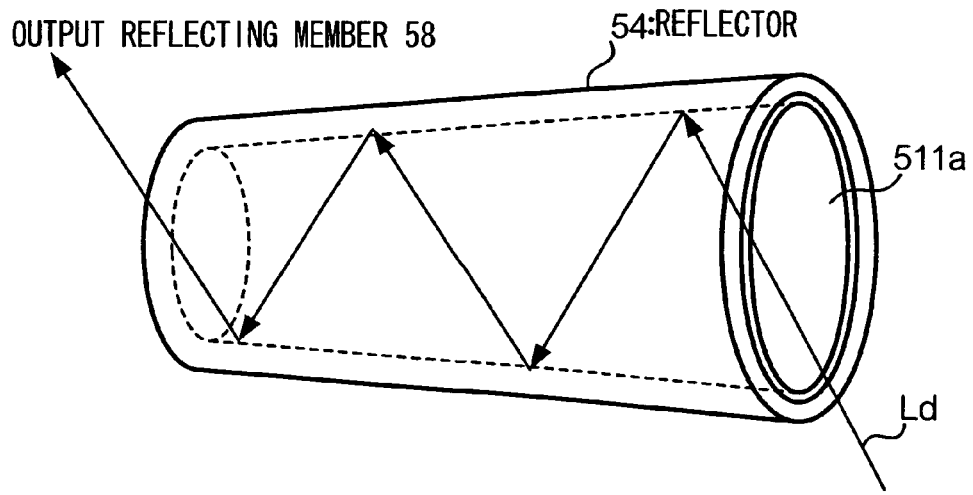

(1) Although a reflector 51 composed of reflecting members 511 disposed opposite each other is illustrated in the above first embodiment, the configuration of the reflector in the present invention is arbitrary. For example, a tubular member (here, cylindrical) with mirror surfaces 511a formed on the inner surface may be adopted as a reflector 52, as shown in FIG. 18(a). In this configuration, the pixel display light Ld output from the light path length control means 4 is incident on the inside of the reflector 52, and reaches the output reflecting member 58 after being sequentially reflected by the mirror surfaces 511a formed on the inner surface of the reflector 52. Also, it is not absolutely necessary for the mirror surfaces 511a in the reflector to be parallel with each other. For example, a reflector 53 whose reflecting members 511 are opposed so that the distance therebetween varies depending on the position (i.e., a reflector 53 in which one of the reflecting members 511 slopes relative to the other reflecting member 511) can also be adopted, as shown in FIG. 18(b), or a (tapered) tubular member whose diameter changes continuously from one end to the other end may be used as a reflector 54, as shown in FIG. 18(c). That is, there are no objections regarding the specific mode of the reflector in the present invention, provided that the configuration has light reflecting surfaces opposing each other (mirror surfaces 511a). Also, while a configuration was illustrated in the above embodiments in which light output from the reflector 51 (or 52, 53, 54) is output to the screen S via the output reflecting member

58, a configuration is possible in which light output from the reflector 51 reaches the screen S directly (i.e., without passing via other members such as the output reflecting member 58).

(2) Although a light output means 3 that adopts light-emitting diodes of different colors as a light source 31 is illustrated in the above embodiments, the configuration of this means is arbitrary. For example, a device composed of an illuminator (back light) that outputs white light, and an LCD panel that adjusts the light intensities of portions corresponding to the colors red, green and blue to light intensities specified by the pixel values Cg may be adopted as the light source 31. In short, there are no objections regarding the specific configuration of the light source 31, provided the light source 31 outputs pixel display light Ld whose wavelength components corresponding to the different colors have light intensities that depend on the pixel values Cg. Note that the configuration for adjusting the light intensity per color is not necessary in a projection display device D that displays monochrome images. A configuration in which pixel display light Ld is output at a light intensity that depends on gradations specified as pixel values Cg is sufficient. As is also clear from this, a "pixel value" equates to information showing the light intensity for different colors in a configuration that displays color images, and equates to information showing gradations in a configuration that displays monochrome images. Also, the lens 32 shown in the above embodiments is not an essential element of the present invention and may be omitted accordingly.

(3) Although a configuration was illustrated in the above embodiments in which the acquiring means 2 reads pixel values Cg and depth values Cz from the storage means 1, the configuration in which the acquiring means 2 acquires pixel values Cg and depth values Cz is not limited to this. For example, a configuration is possible in which only the pixel value Cg for each pixel is stored in the storage means 1, and the acquiring means 2 calculates the depth values Cz based on these pixel values Cg. A configuration is also possible, for example, in which the gradation values of the colors red, green and blue specified by the pixel values Cg are weighted accordingly, after which gray scales are calculated by summing these gradation values, and the calculated gray scales are output to the light path length control means 4 (or the control means 355 in the fourth embodiment) as depth values Cz. Further, various types of correction may be performed on the gray scales and the numeric values after correction adopted as depth values Cz. The method of calculating the depth values Cz in this configuration is arbitrary. Also, the acquisition source of the pixel values Cg and the depth values Cz is not limited to the storage means 1. For example, a configuration is possible in which the acquiring means 2 acquires pixel values Cg and depth values Cz input from an external source. A configuration is also possible, for example, in which the acquiring means 2 receives pixel values Cg and depth values Cz from another communication device connected via a network. Thus, there are no objections regarding the acquisition source and method, provided the acquiring means 2 in the present invention acquires the pixel values Cg and depth values Cz of pixels.

Figure 19:
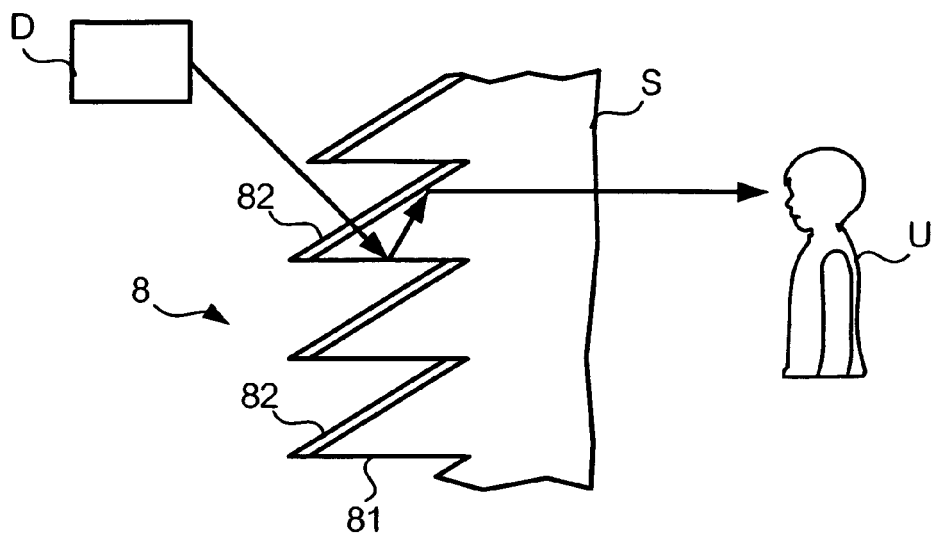
FIG. 19 shows the configuration of a projection display system according to a modification 4.

(4) Although a configuration was illustrated in the above embodiments in which an image is projected by disposing a projection display device D on the viewing side relative to the screen S, the projection display device D may be disposed on the side opposite the viewing side (hereinafter, "backside"), as shown in FIG. 19. In the configuration shown in this figure, the projection surface 8 is provided on the backside of the screen S, and the second mirror surface 82 of this projection surface 8 is a half mirror (semi-transmissive reflecting layer). Consequently, part of the pixel display light Ld that arrives at the second mirror surface 82 from the backside of the screen S passes selectively though the second mirror surface 82 (the remainder is reflected). The first mirror surface 81 is a substantially horizontal mirror surface as shown in the above embodiments. According to this configuration, pixel display light Ld that passes through the second mirror surface 82 is reflected onto the second mirror surface 82 by the first mirror surface 81, and part of this light is reflected again by the second mirror surface 82 and output on the viewing side.

Figure 20:
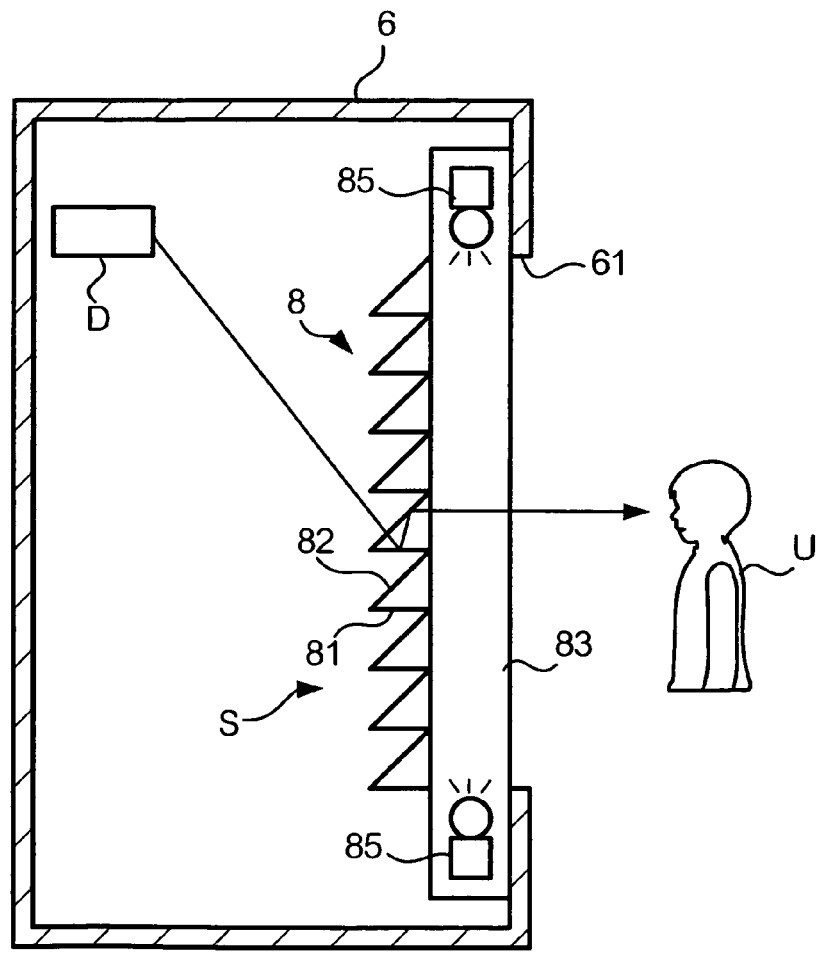
FIG. 20 shows the configuration of a projection display system according to modification 4.

Also, the projection display device D and the screen S may be integrated, as shown in FIG. 20. In the configuration shown in FIG. 20, a substantially rectangular parallelepiped casing 6 is provided with an opening 61 in one surface (on the viewing side), and a projection display system DS as shown in the above embodiments is housed in the casing 6. This projection display system DS projects an image from the backside of the screen S, as described with reference to FIG. 19. The screen S is fixed inside the casing 6 so as to block the opening 61, and has a reflecting member 82, a transmission member 83 and a plurality of illuminating devices 85. The transmission member 83 is a plate-shaped member having optical transparency, and a vicinity of the ends thereof is fixed along the periphery of the opening 61. The reflecting member 82 is provided on the plate surface at the backside of the transmission member 83 and constitutes the projection surface 8, with the first mirror surface 81 and second mirror surface 82 being arranged alternately. The first mirror surface 81 is a substantially horizontal mirror surface that mirror-reflects the pixel display light Ld. The second mirror surface 82 is a half mirror that transmits only part of the pixel display light Ld and reflects the rest, and is provided so as to form a predetermined angle (e.g., 45 degrees) with the first mirror surface 81. Also, each of the plurality of illuminating devices 85 outputs white light towards the center of the projection surface 8. These illuminating devices 85, seen from the viewing side, are buried so as to surround the projection surface 8 in sections of the transmission member 83 covered by the casing 6. Based on this configuration, pixel display light Ld that is output from the projection display device D and passes through the second mirror surface 82 is reflected onto the second mirror surface 82 by the first mirror surface 81, and then output on the viewing side and seen by the viewer U after again being reflected and passing through the transmission member 83. The brightness of the image can be maintained at a high level since white light from the illuminating devices 85 is output at this time.

(5) Although a configuration was illustrated in the above embodiments in which the number of times the pixel display light Ld is reflected by the reflector 51 (or 52, 53, 54) is controlled by the control means 45 driving the adjustment reflecting member 41 or 42, the configuration for controlling the light path length of the pixel display light Ld from the light output means 3 to the projection surface 8 according to the depth values Cz is not limited to this. For example, a configuration can also be adopted in which the angle at which the pixel display light Ld is incident on the reflector 51 is changed by controlling the orientation of the light output means 3 according to the depth values Cz after having fixed the angle of the adjustment reflecting member 41 (or after having made the orientation variable as in the above embodiments), and thereby changing the reflected number of times in the reflector 51 according to the depth values Cz.

Also, while a configuration was illustrated in the above embodiments in which an image with a sense of three-dimensionality is displayed by controlling the light path length from the light source 31 to the projection surface 8, a configuration can also be additionally adopted that makes it possible to display an image without controlling the light path length according to the depth values Cz. For example, a configuration is possible in which a 3D display mode and a normal display mode are switched according to an operation on an input device by the user, with an image being displayed in the 3D display mode by controlling the light path length from the light source 31 to the projection surface 8 according to the depth values Cz (image in which a sense of three-dimensionally is perceived by the user), as shown in the above embodiments, and an image being displayed in the normal display mode without controlling the light path length according the depth values Cz (i.e., image in which a sense of three-dimensionally is not perceived by the user). The operation in the normal display mode is arbitrary, although a configuration can be adopted in which the adjustment reflecting member 41 is driven so that the reflected number of times in the reflector 51 is constant irrespective of the depth values Cz, or in which the adjustment reflecting member 41 is driven so that light reflected by the adjustment reflecting member 41 reaches the output reflecting member 58 without passing through the reflection in the reflector 51.

(6) The acquiring means 2 and the control means 45 (more specifically, the instruction means 451) of the projection display device D according to the above embodiments may be realized by cooperation between a hardware device such as a CPU (central processing unit) and a computer program, or by a dedicated circuit manufactured on the premise that the circuit be mounted in the projection display device D. Also, while a configuration was illustrated in the above embodiments in which the drive content of the adjustment reflecting member 41 (or 42) is identified based on the table TBL, the method for identifying this drive content according to the depth values Cz (consequently, a method for identifying the reflected number of times in the reflector 51) is arbitrary. For example, a configuration can also be adopted in which the angle of the adjustment reflecting member 41 or the rotation angle of the adjustment reflecting member 42 is identified by performing an operation on the depth values Cz output from the acquiring means 2 using a prescribed arithmetic expression. Also, the configuration of the adjustment reflecting member 41 is arbitrary. For example, a configuration can also be adopted in which a known digital micro mirror device composed of arrayed micro mirror elements is used as the adjustment reflecting member 41. In this configuration, similar effects to the above embodiments are obtained if a configuration is adopted in which the angle of the micro mirrors of the micro mirror elements is controlled according to the depth values Cz.

The invention claimed is:

1. A projection display device comprising:
   a storage means for storing a pixel value and a depth value for each of a plurality of pixels constituting a display image;
   an acquiring means for acquiring the pixel value and the depth value for each of a plurality of pixels stored in the storage means;
   a light output means for sequentially outputting light per pixel according to the pixel value;
   a reflecting member for reflecting the light sequentially output per pixel from the light output means;
   a light guide body that has a light reflecting surface for repeatedly reflecting light reflected by the reflecting member, and guides the light to a position corresponding to the pixel on a projection surface; and
   a control means for changing an angle at which the light reflected by the reflecting member is incident on the light guide body by driving the reflecting member according to the depth value of the pixel, so as to change a light path length to the projection surface determined depending on the number of times of the repeated reflections according to the depth value of each pixel.

2. The projection display device according to claim 1, wherein the depth value stored for each pixel is stored after calculation based on the pixel value of the pixel.

3. The projection display device according to claim 1, wherein the control means drives the reflecting member so that the number of times of the repeated reflections increases the larger the depth value.

4. The projection display device according to claim 1, wherein
   the reflecting member has a reflecting surface for reflecting the light output from the light output means, and capable of changing an angle relative to a direction of the output light, and
   the control means controls the angle of the reflecting surface according to the depth value.

5. The projection display device according to claim 1, wherein
   the reflecting member is supported so as to be rotatable on a rotary shaft, and has a reflecting surface whose angle relative to a direction of the light output from the light output means changes in a circumferential direction of the rotary shaft, and
   the control means rotates the reflecting member to an angle that depends on the depth value.

6. The projection display device according to claim 1, wherein the control means further makes the reflecting member oscillate with an amplitude that depends on the depth value.

7. The projection display device according to claim 1, further comprising a light flux adjusting means for changing a light flux cross-sectional area of the light output from the light output means according to the depth value of each pixel.

8. The projection display device according to claim 7, wherein
   the control means drives the reflecting member so that the number of times of the repeated reflections increases the larger the depth value of each pixel, and
   the light flux adjusting means changes the light flux cross-sectional area of the light output from the light output means so that the light flux cross-sectional area increases the larger the depth value.

9. The projection display device according to claim 1, comprising a correction means for correcting the depth value of each pixel according to the position corresponding to the pixel on the projection surface, wherein
   the control means controls the number of times of the repeated reflections according to the depth value after correction by the correction means.

10. The projection display device according to claim 9, wherein
    the correction means corrects the depth value so that when the same depth value is given to one pixel and another pixel, the light path lengths of the light output from the light output means to the projection surface for the one pixel and the other pixel are substantially the same.

11. A projection display system comprising a screen that has a projection surface and a projection display device for projecting an image onto the screen, the projection display device including:

- a storage means for storing a pixel value and a depth value for each of a plurality of pixels constituting a display image;
- an acquiring means for acquiring the pixel value and the depth value for each of a plurality of pixels stored in the storage means;
- a light output means for sequentially outputting light per pixel according to the pixel value;
- a reflecting member for reflecting the light output from the light output means and guiding the light to the light guide body;
- a light guide body that has a light reflecting surface for repeatedly reflecting light sequentially output per pixel from the light output means, and guides the light to a position corresponding to the pixel on a projection surface; and
- a control means that drives the reflecting member so that an angle at which light reflected by the reflecting member is guided to the light guide body depending on the depth value, and changes the number of times the light sequentially output per pixel from the light output means is repeatedly reflected by the light reflecting surface according to the depth value of the pixel, so as to change a light path length to the projection surface according to the depth value of each pixel.

12. The projection display system according to claim 10, wherein the projection surface of the screen is composed of a first reflecting surface for reflecting the light output from the projection display device, and a second reflecting surface for reflecting the light reflected by the first reflecting surface on a viewing side, the first and second reflecting surfaces being arranged in sheets.

13. The projection display system according to claim 11, wherein the first reflecting surface is substantially horizontal, and the second reflecting surface forms a prescribed angle with the first reflecting surface, and does not directly faces the viewing side.

14. The projection display system according to claim 12, wherein the second reflecting surface is divided into a plurality of unit portions, each of which is a curved surface whose center protrudes more than a periphery thereof.

15. The projection display system according to claim 11, wherein the first reflecting surface is divided into a plurality of unit portions whose angle relative to a horizontal surface is selected for each unit portion according to an angle at which the light output from the projection display device reaches the unit portion.

* * * * *